United States Patent
Muraoka

(10) Patent No.: US 11,962,920 B2
(45) Date of Patent: Apr. 16, 2024

(54) IMAGING DEVICE, METHOD OF DRIVING IMAGING DEVICE, AND ELECTRONIC EQUIPMENT

(71) Applicant: SONY SEMICONDUCTOR SOLUTIONS CORPORATION, Kanagawa (JP)

(72) Inventor: Kazuhiko Muraoka, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 15 days.

(21) Appl. No.: 17/634,062

(22) PCT Filed: Jun. 1, 2020

(86) PCT No.: PCT/JP2020/021611
§ 371 (c)(1),
(2) Date: Feb. 9, 2022

(87) PCT Pub. No.: WO2021/033388
PCT Pub. Date: Feb. 25, 2021

(65) Prior Publication Data
US 2022/0353441 A1    Nov. 3, 2022

(30) Foreign Application Priority Data
Aug. 20, 2019  (JP) ................. 2019-150214

(51) Int. Cl.
*H04N 25/50* (2023.01)
*H04N 25/40* (2023.01)
*H04N 25/76* (2023.01)

(52) U.S. Cl.
CPC ............ *H04N 25/50* (2023.01); *H04N 25/40* (2023.01); *H04N 25/76* (2023.01)

(58) Field of Classification Search
CPC ......... H04N 25/40; H04N 25/50; H04N 25/76
See application file for complete search history.

(56) References Cited

U.S. PATENT DOCUMENTS 8,089,522 B2 * 1/2012 Choi .................... H04N 25/443
348/222.1
2015/0077590 A1   3/2015 Kuriyama et al.

FOREIGN PATENT DOCUMENTS

CN        104272721 A    1/2015
EP        2846538 A1     3/2015
(Continued)

OTHER PUBLICATIONS

International Search Report and Written Opinion of PCT Application No. PCT/JP2020/021611, dated Aug. 18, 2020, 10 pages of ISRWO.

*Primary Examiner* — Kevin K Pyo
(74) *Attorney, Agent, or Firm* — CHIP LAW GROUP

(57) ABSTRACT

An imaging device of the present disclosure includes: a pixel array section in which pixels including light receiving elements are arranged; a first pixel control section that performs control to read out signals of all the pixels in the pixel array section at a first frame rate; a second pixel control section that performs control to read out signals of the pixels in a specific region in the pixel array section at a second frame rate higher than the first frame rate; and an analog-to-digital conversion section that performs an analog-to-digital conversion on a pixel signal read out by the control performed by the first pixel control section or the second pixel control section.

16 Claims, 23 Drawing Sheets

(56) References Cited

FOREIGN PATENT DOCUMENTS

| | | | |
|---|---|---|---|
| JP | 2018-033072 | A | 3/2018 |
| JP | 2018-186576 | A | 11/2018 |
| JP | 2019-134202 | A | 8/2019 |

* cited by examiner

IMAGING DEVICE, METHOD OF DRIVING IMAGING DEVICE, AND ELECTRONIC EQUIPMENT

CROSS REFERENCE TO RELATED APPLICATIONS

This application is a U.S. National Phase of International Patent Application No. PCT/JP2020/021611 filed on Jun. 1, 2020, which claims priority benefit of Japanese Patent Application No. JP 2019-150214 filed in the Japan Patent Office on Aug. 20, 2019. Each of the above-referenced applications is hereby incorporated herein by reference in its entirety.

TECHNICAL FIELD

The present disclosure relates to an imaging device, a method of driving an imaging device, and electronic equipment.

BACKGROUND ART

With advances of machine learning and AI technologies in response to the progress of semiconductor technology, a moving-image analysis technology in a limited region (specific region) has developed to a practical level. In order for an imaging device to be adaptable to the moving-image analysis technology in the limited region, it is desired that the imaging device be able to achieve readout driving of a pixel in the specific region and readout driving of a pixel in a whole angle of view that is usable as an aid or for confirmation in extracting the specific region. Incidentally, an existing imaging device is produced for the purpose of acquiring a single photograph or an image of a single screen, and therefore all pixels in a pixel array section (pixels in the whole angle of view) are subjected to the same readout driving.

Japanese Unexamined Patent Application Publication No. 2018-186576 (PTL 1) discloses an imaging device in which a pixel array section is divided into a plurality of blocks and independent driving is performed on a per-block basis, specifically, an imaging device in which each of the plurality of divided blocks has an independent structure, and driving is performed on a per-block basis at independent timing. According to this existing technique, driving each of the blocks at independent timing makes it possible to achieve high frame rate driving for only a specific region on a per-block basis.

CITATION LIST

Patent Literature

PTL 1: Japanese Unexamined Patent Application Publication No. 2018-186576

SUMMARY OF THE INVENTION

Problems to be Solved by the Invention

The imaging device described in PTL 1 has a circuit structure equivalent to that of a typical imaging device, including one or more analog-to-digital converters, memory, and a data processing section, for each of individual blocks divided in a matrix. Therefore, the number of the analog-to-digital converters to be mounted on the imaging device described in PTL 1 is very large as compared with that in a commonly used imaging device that performs analog-to-digital conversion on a per-row basis.

Analog-to-digital converters are large in circuit size and high in power consumption. In addition, the analog-to-digital converters are designed with analog circuit technology, and power consumption thus occurs on the basis of a power-on time regardless of an operating state. Further, memories for storing analog-to-digital converted data are also large in circuit size and high in power consumption, and are very large in number because the memories are necessary in the number as large as the number of the pixels. The imaging device described in PTL 1 is thus large in circuit scale and high in power consumption.

It is an object of the present disclosure to provide an imaging device, a method of driving an imaging device, and electronic equipment including the imaging device that make it possible to achieve readout driving of a pixel in a specific region and readout driving of a pixel in a whole angle of view with a small circuit scale and low power consumption.

Means for Solving the Problems

An imaging device of the present disclosure for attaining the above object includes:
- a pixel array section in which pixels including light receiving elements are arranged;
- a first pixel control section that performs control to read out signals of all the pixels in the pixel array section at a first frame rate;
- a second pixel control section that performs control to read out signals of the pixels in a specific region in the pixel array section at a second frame rate higher than the first frame rate; and
- an analog-to-digital conversion section that performs an analog-to-digital conversion on a pixel signal read out by the control performed by the first pixel control section or the second pixel control section.

A method of driving an imaging device of the present disclosure, the imaging device including
- a pixel array section in which pixels including light receiving elements are arranged, and
- an analog-to-digital conversion section that performs an analog-to-digital conversion on a pixel signal read out from the pixel array section, for attaining the above object includes, in driving the imaging device,
- reading out signals of all the pixels in the pixel array section at a first frame rate, and
- reading out signals of the pixels in a specific region in the pixel array section at a second frame rate higher than the first frame rate.

Electronic equipment of the present disclosure for attaining the above object includes
an imaging device including:
- a pixel array section in which pixels including light receiving elements are arranged;
- a first pixel control section that performs control to read out signals of all the pixels in the pixel array section at a first frame rate;
- a second pixel control section that performs control to read out signals of the pixels in a specific region in the pixel array section at a second frame rate higher than the first frame rate; and
- an analog-to-digital conversion section that performs an analog-to-digital conversion on a pixel signal read out by the control performed by the first pixel control section or the second pixel control section.

MODES FOR CARRYING OUT THE INVENTION

Figure 1:
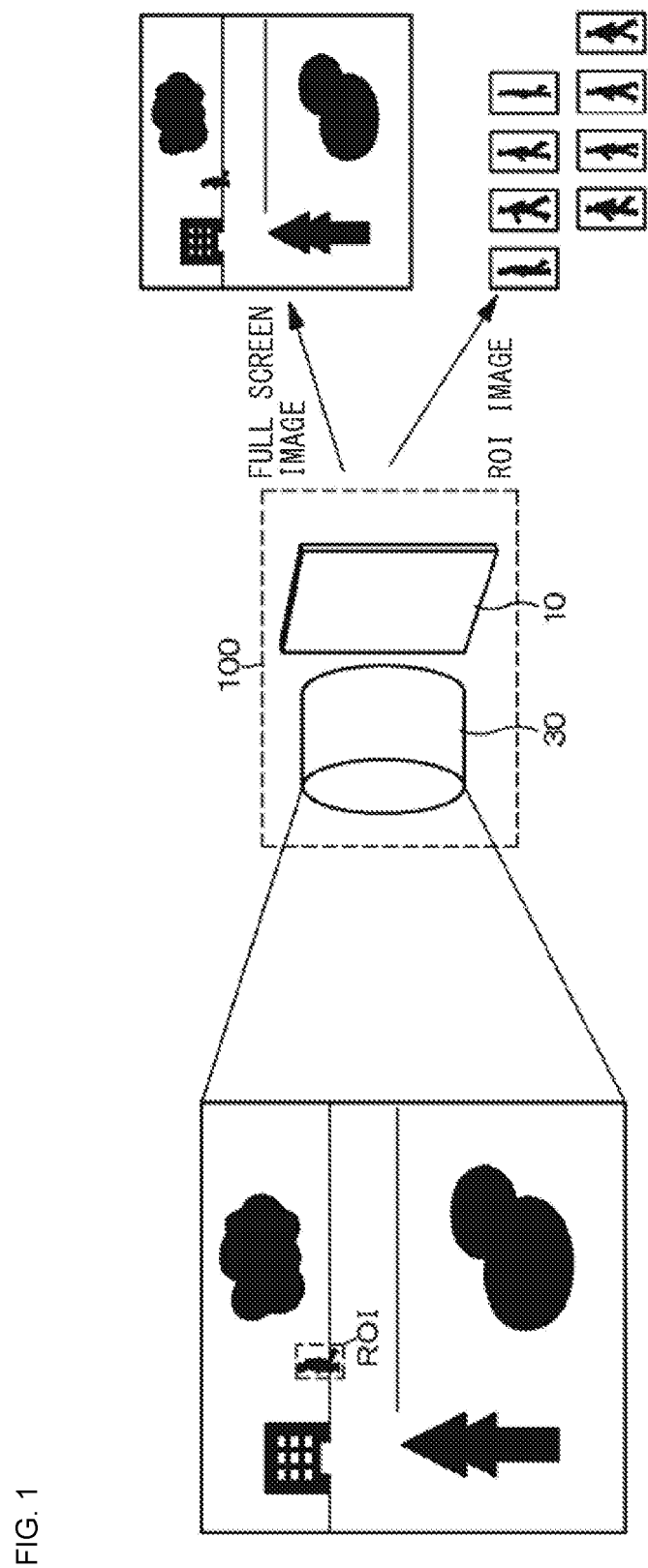
FIG. 1 is a diagram illustrating an operation image of the technology of the present disclosure.

In the following, modes for carrying out the technology of the present disclosure (hereinafter referred to as "embodiments") will be described in detail with reference to the drawings. The technology of the present disclosure is not limited to the embodiments, and various numerical values and the like in the embodiments are illustrative. In the following description, the same elements or elements having the same functions are denoted by the same reference signs, and redundant descriptions are omitted. Note that the description will be given in the following order.

1. Overall Description of Imaging Device, Method of Driving Imaging Device, and Electronic Equipment of Present Disclosure
2. Operation Image of Technology of Present Disclosure
3. Other Approaches to Readout Driving for Full Screen Image and Readout Driving for ROI Image
   3-1. Other Approach 1
   3-2. Other Approach 2
   3-3. Other Approach 3 (existing technique described in PTL 1)
4. Imaging Device According to Embodiment
   4-1. Configuration Example of CMOS Image Sensor
   4-2. Configuration Example of Pixel
   4-3. Example 1 (circuit configuration example of analog section)
   4-4. Example 2 (example of performing acquisition of full screen image and acquisition of ROI Image by time-division driving)
   4-5. Example 3 (example of using technique of motion detection in detecting region of interest)
   4-6. Example 4 (modification of Example 1: example of address control in a case where region of interest ROI moves in horizontal direction)
   4-7. Example 5 (modification of Example 1: example of Address Control 1 in a case where region of interest ROI moves in vertical direction)
   4-8. Example 6 (modification of Example 1: example of Address Control 2 in the case where region of interest ROI moves in vertical direction)
   4-9. Example 7 (modification of Example 2: example of address control as a measure against jitter)
   4-10. Example 8 (example of address control in a case where a plurality of regions of interest ROIs is present)
   4-11. Example 9 (modification of Example 8: example of address control in a case where a plurality of regions of interest ROIs moves in directions opposite to each other)
   4-12. Example 10 (example of performing control to cause Image Output 2 not to overlap Image Output 1 in terms of time)
5. Modification Example
6. Example of Practical Application
7. Electronic Equipment of Present Disclosure (example of imaging apparatus)
8. Configurations Employable by Present Disclosure <Overall Description of Imaging Device, Method of Driving Thereof, and Electronic Equipment of Present Disclosure>

In an imaging device, a method of driving thereof, and electronic equipment of the present disclosure, a configuration having a region-of-interest detector that detects a specific region in a captured image as a region of interest may be employed. In addition, the region-of-interest detector may be configured to detect a region having motion in the captured image as the region of interest. Further, the region-of-interest detector may be configured to detect the region having motion in the captured image on the basis of a result of comparison between image information of a current imaging frame and image information preceding by at least one imaging frame.

In the imaging device, the method of driving thereof, and the electronic equipment of the present disclosure including the above-described preferable configurations, a configuration may be employed in which the region-of-interest detector includes an image memory, a comparison section, a movement amount memory, and a region-of-interest determination section. The image memory may be configured to hold the image information preceding by at least one imaging frame, and the comparison section may be configured to acquire a difference absolute value between the image information of the current imaging frame and the image information held in the image memory. Further, the movement amount memory may be configured to store the difference absolute value acquired by the comparison section as a movement amount from a past image to a current image, and the region-of-interest determination section may be configured to determine the region of interest on the basis of the movement amount stored in the movement amount memory.

Further, in the imaging device, the method of driving thereof, and the electronic equipment of the present disclosure including the above-described preferable configurations, a configuration may be employed in which the region-of-interest detector includes a location information acquisition section that acquires vertical location information and horizontal location information of a physical location of a region determined as the region of interest by the region-of-interest determination section. In addition, a second pixel control section may be configured to repeatedly execute a readout operation on a signal of each of the pixels in a pixel row including the region of interest on the basis of the vertical location information acquired by the location information acquisition section.

Further, in the imaging device, the method of driving thereof, and the electronic equipment of the present disclosure including the above-described preferable configurations, a configuration having a latch buffer section that latches pixel data after analog-to-digital conversion by an analog-to-digital conversion section, and a horizontal region-of-interest cutting section that performs cutting, in a horizontal direction, of the pixel data outputted from the latch buffer section on the basis of the vertical location information acquired by the location information acquisition section may be employed.

Further, in the imaging device, the method of driving thereof, and the electronic equipment of the present disclosure including the above-described preferable configurations, a configuration may be employed in which two systems of signal lines for reading out a signal of each of the pixels in a pixel array section are provided on a per-pixel-column basis. In addition, a configuration may be employed in which each of the pixels in the pixel array section has two switches for reading out the signal of the pixel to the two systems of signal lines, respectively. Further, a configuration may be employed in which two systems of analog-to-digital conversion sections are also provided in correspondence with the two systems of signal lines, respectively.

Further, in the imaging device, the method of driving thereof, and the electronic equipment of the present disclosure including the above-described preferable configurations, a first pixel control section and the second pixel control section may be configured to perform control to read out signals of all the pixels in the pixel array section and signals of the pixels in the specific region concurrently through the two systems of signal lines.

Further, in the imaging device, the method of driving thereof, and the electronic equipment of the present disclosure including the above-described preferable configurations, a configuration may be employed in which one system of signal line for reading out the signal of each of the pixels in the pixel array section is provided on a per-pixel-column basis. In addition, the first pixel control section and the second pixel control section may be configured to perform control to read out the signals of all the pixels in the pixel array section and the signals of the pixels in the specific region in a time-division manner by switching therebetween alternately in terms of time.

Further, in the imaging device, the method of driving thereof, and the electronic equipment of the present disclosure including the above-described preferable configurations, a configuration having a chip structure including a single chip may be employed.

<Operation Image of Technology of Disclosure>

An operation image of the technology of the present disclosure is illustrated in FIG. 1. An imaging apparatus 100 includes an imaging element 10 of the present disclosure, and a lens barrel 30 or the like. The imaging device 10 has a chip structure including a single chip with one row of analog-to-digital converters that perform analog-to-digital conversion of signals read out from pixels. The imaging device 10 of the present disclosure includes a first pixel control section that performs control to read out signals of all the pixels in a pixel array section at a first frame rate, and a second pixel control section that performs control to read out signals of the pixels in a specific region ROI (Region of Interest: region of interest) in the pixel array section at a second frame rate higher than the first frame rate. Hereinafter, the second frame rate for the second pixel control section may be described as a high frame rate.

Thus, the imaging device 10 of the present disclosure includes a plurality of pixel control sections (e.g., the first pixel control section and the second pixel control section), thereby having a structure to perform a plurality of types of control on a single pixel array section and read out signals of pixels in corresponding regions. Note that the structure may include a single second pixel control section or a plurality of second pixel control sections. The imaging device 10 of the present disclosure achieves full screen image output and high frame rate ROI image output with less burden on circuit resources and electric power by performing readout control including analog-to-digital conversions in a devised way under the control of the plurality of pixel control sections. Here, the "ROI image output" refers to image output for the specific region ROI.

As described above, the imaging device 10 of the present disclosure is configured to perform analog-to-digital conversions only on the full screen image output and the high frame rate ROI image output. Therefore, according to the imaging device 10 of the present disclosure, it is possible to achieve readout driving of pixels in a whole angle of view (i.e., readout driving for the full screen image) and readout driving of pixels in the specific region ROI (i.e., readout driving for the ROI image) with low power consumption. Details of the imaging device 10 of the present disclosure will be described later.

<Other Approaches to Readout Driving for Full Screen Image and Readout Driving for ROI Image>

Now, other approaches to readout driving for the full screen image and readout driving for the ROI image will be described.

[Other Approach 1]

Figure 2:
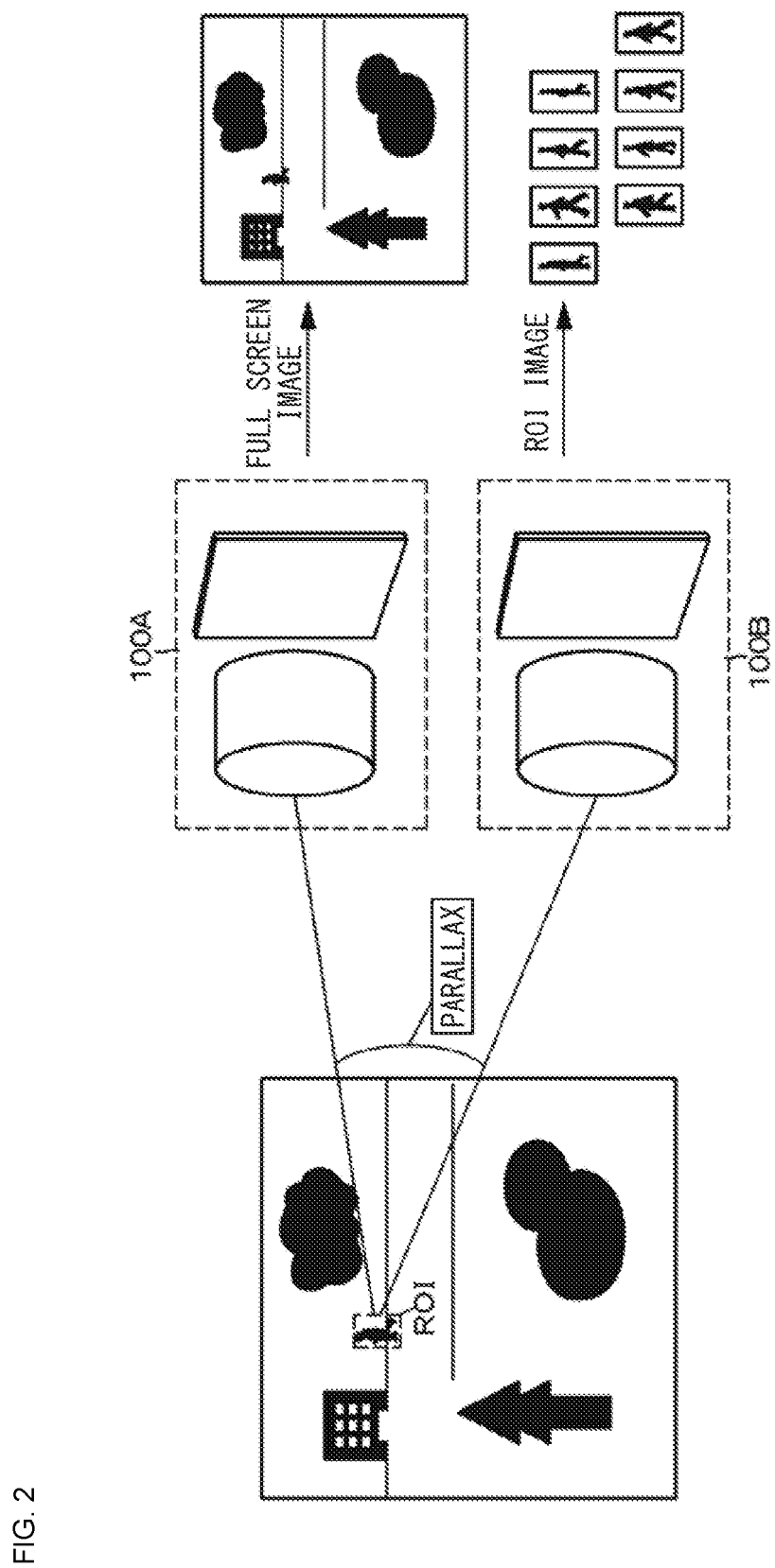
FIG. 2 is a diagram illustrating an operation image of Other Approach 1.

FIG. 2 illustrates an operation image of Other Approach 1. Other Approach 1 is an approach of performing driving on different regions by using two imaging apparatuses 100A and 100B. This Approach 1 involves cost and installation space of the two imaging apparatuses 100A and 100B. Further, a parallax results from the two imaging apparatuses 100A and 100B, causing the ROI image and the full screen image to be different images, resulting in inaccurate information.

[Other Approach 2]

Figure 3:
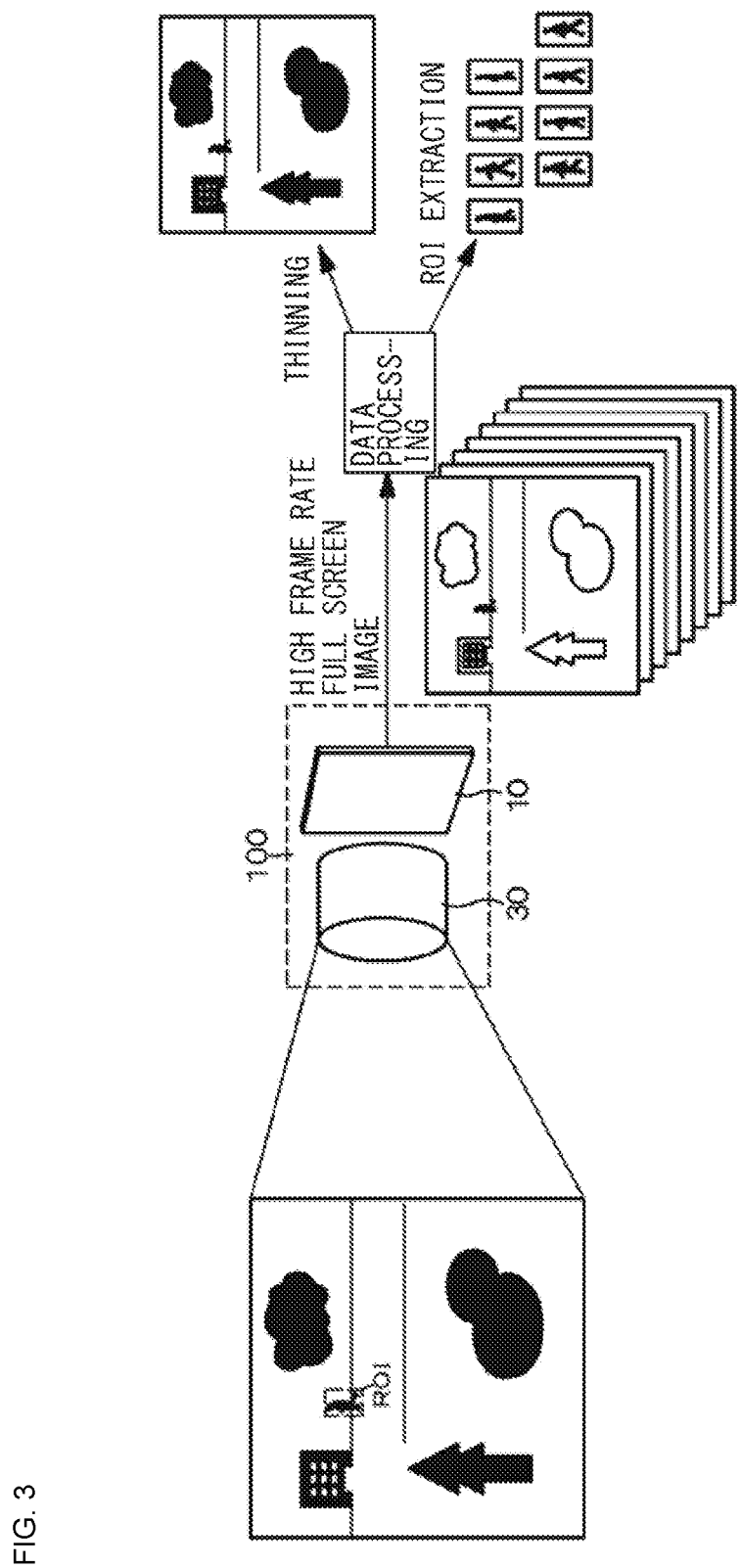
FIG. 3 is a diagram illustrating an operation image of Other Approach 2.

FIG. 3 illustrates an operation image of Other Approach 2. Other Approach 2 is an approach of acquiring data at a high frame rate in advance and deleting information other than that of the specific region ROI at a data processing section. According to this Approach 2, a large number of images are acquired by using a high-speed imaging device, and data is discarded to thereby create a low frame rate full screen image and a high frame rate ROI image.

In the case of Approach 2, it is possible to cut down a final output data amount; however, because internal circuits are to operate at a high frame rate, a development cost to be spent thereon, a circuit scale, and power consumption are very high. The operation principle is to discard output in outputting the full screen image so as to achieve a low frame rate, and to discard data other than that of the specific region ROI in outputting the ROI image to thereby reduce only an output bit rate, thus discarding most of analog-to-digital converted data.

[Other Approach 3]

Other Approach 3 is the existing technique described in PTL 1. In the existing technique described in PTL 1, each of the individual blocks divided in a matrix is provided with a circuit structure equivalent to that of a typical imaging device, including one or more analog-to-digital converters, memory, a data processing section, and an output line. Therefore, in the imaging device described in PTL 1, the number of the analog-to-digital converters is very large as compared with that in a commonly used imaging device that performs analog-to-digital conversion on a per-row basis, and this results in a large circuit scale and high power consumption.

In Other Approach 3, routing of output lines also becomes a problem. Because a control line and an output data signal line are provided for each of the blocks divided in a matrix and an output interface is finally at one location, the output lines of the respective blocks are consolidated. The consolidation destination is a peripheral portion of a system outside the pixel array section. This results in a long line length and involves a large area as a circuit size because of a very large number of wiring lines.

As a characteristic of an imaging device, high-density mounting is typically employed because image quality is degraded unless a gap between pixels is kept small. The high-density mounting is difficult to achieve with single-layer design, thus necessitating stacking of a plurality of chips and the use of metal bonding technique or the like in order to secure terminals through which many signal lines are to pass. However, because the analog-to-digital converters and memories are large in circuit size, the backside of the pixel array section is filled with the analog-to-digital converters and memories, the lines are collected to the outside of the pixel array section, and circuits for image data processing are placed outside the pixel array section. This causes the area of the chips to be large and raises the cost of the chips.

For the reasons described above, the imaging device described in PTL 1 is larger in both of circuit size and power consumption, and higher in cost than a typical imaging device. With an increase in power consumption, the imaging device (camera system) itself increases in scale, thus becoming expensive. Then, because of the high cost and high power consumption, application to products is significantly limited. The imaging device described in PTL 1 is thus positioned as a special imaging device.

Imaging Device According to Embodiment

A system configuration of an imaging device according to an embodiment of the present disclosure will be described. In the present embodiment, a CMOS (Complementary Metal Oxide Semiconductor) image sensor, which is a type of imaging device of an X-Y addressing method, will be described as an example of the imaging device. The CMOS image sensor is an image sensor fabricated by applying or partly using a CMOS process. [System Configuration]

Figure 4:
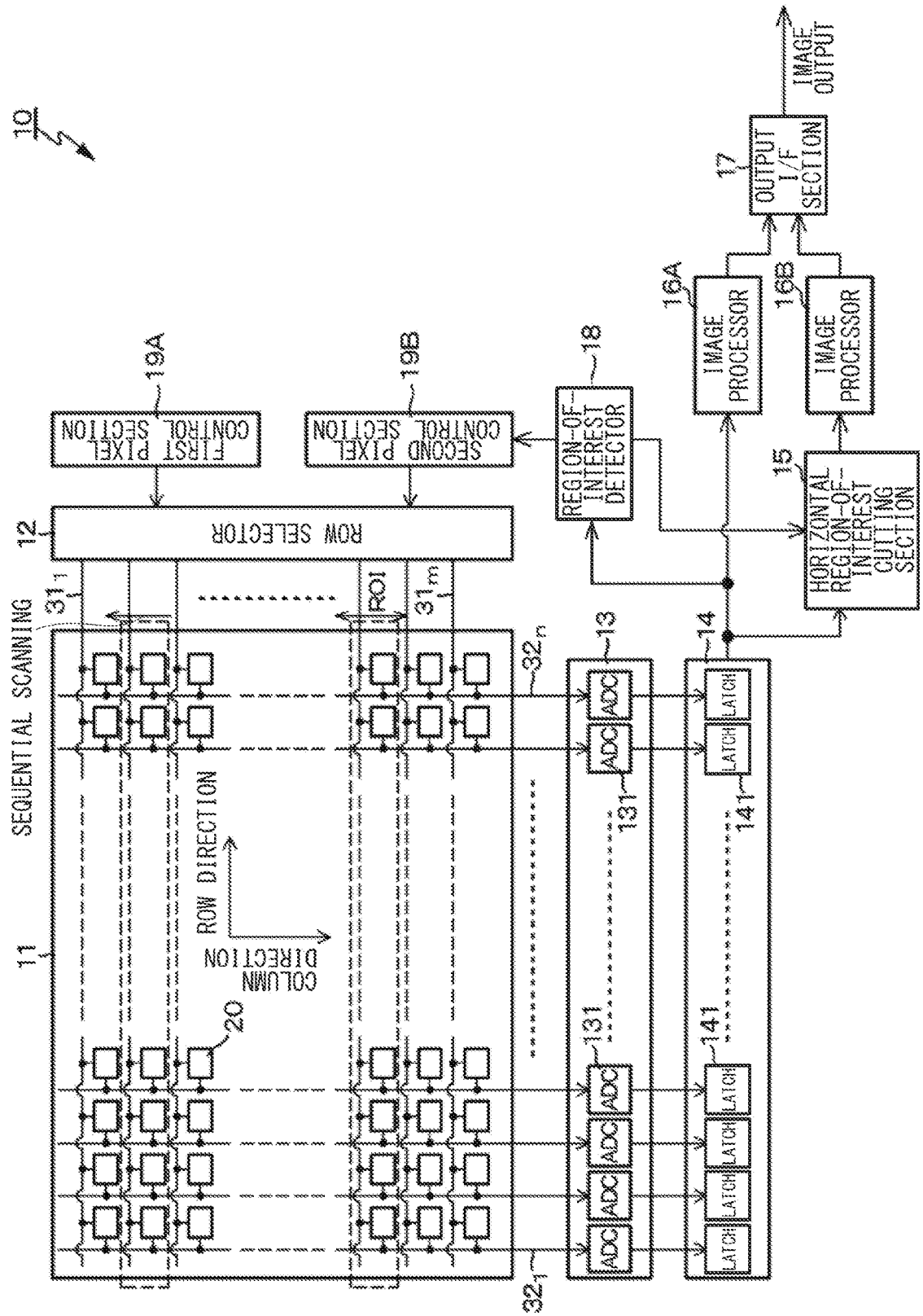
FIG. 4 is a conceptual diagram illustrating a system configuration of an imaging device according to an embodiment of the present disclosure.

FIG. 4 is a conceptual diagram illustrating a system configuration of the imaging device according to the embodiment of the present disclosure. As illustrated in FIG. 4, the imaging device 10 according to the present embodiment has a configuration including a pixel array section 11 and a peripheral circuit section disposed on the periphery of the pixel array section 11. As the peripheral circuit section, for example, a row selector 12, an analog-to-digital conversion section 13, a latch buffer section 14, a horizontal region-of-interest cutting section 15, image processors 16A and 16B, an output interface (I/F) section 17, a region-of-interest detector 18, a first pixel control section 19A, a second pixel control section 19B, etc. are provided.

In the pixel array section 11, pixels 20 including photoelectric converters (light receiving elements) are two-dimensionally arranged in a row direction and a column direction, that is, in a matrix. Here, the row direction refers to a direction of arrangement of the pixels 20 in a pixel row (a so-called horizontal direction), and the column direction refers to a direction of arrangement of the pixels 20 in a pixel column (a so-called vertical direction). In the following, the row direction may be described as the horizontal direction, and the column direction may be described as the vertical direction. The pixel 20 performs photoelectric conversion to thereby to generate and accumulate photoelectric charge corresponding to the amount of received light. A specific circuit configuration of the pixel 20 will be described later.

In the pixel array section 11, pixel drive lines $31_1$ to $31_m$ (which may hereinafter be collectively referred to as "pixel drive lines 31") are wired along the row direction for respective pixel rows in the pixel arrangement in a matrix. Further, vertical signal lines $32_1$ to $32_n$ (which may hereinafter be collectively referred to as the "vertical signal lines 32") are wired along the column direction for respective pixel columns. The pixel drive line 31 transmits a drive signal used to perform driving when reading out a signal from the pixel 20. Although the pixel drive line 31 is illustrated as a single wiring line in FIG. 1, the number of the pixel drive lines 31 is not limited to one. Respective one ends of the pixel drive lines 31 are coupled to output ends of the row selector 12 corresponding to the respective rows.

The following will describe each circuit section of the peripheral circuit section for the pixel array section 11, that is, the row selector 12, the analog-to-digital conversion section 13, the latch buffer section 14, the horizontal region-of-interest cutting section 15, the image processors 16A and 16B, the output interface (I/F) section 17, the region-of-interest detector 18, the first pixel control section 19A, and the second pixel control section 19B.

The row selector 12 includes a shift register, an address decoder, etc., and drives the pixels 20 in the pixel array section 11 on a per-row basis or the like under the control by the first pixel control section 19A or the second pixel control section 19B. The pixels 20 in the pixel array section 11 are selected on a per-pixel-row basis by the row selector 12, whereby a signal (that is, a pixel signal) is read out from each of the pixels in the selected pixel row.

The pixels 20 in the pixel row selectively scanned by the row selector 12 are supplied with a bias current on a per-pixel-column basis through the respective vertical signal lines $32_1$ to $32_n$ from a current source I (see FIG. 5) including MOS field-effect transistors coupled to the respective vertical signal lines $32_1$ to $32_n$. The pixel signals read out from the pixels 20 in the pixel array section 11 on a per-pixel-row basis are supplied to the analog-to-digital conversion section 13 through the respective vertical signal lines $32_1$ to $32_n$.

The analog-to-digital conversion section 13 includes an assembly of a plurality of analog-to-digital converters (ADCs) 131 provided in correspondence with the respective vertical signal lines $32_1$ to $32_n$, and converts analog pixel signals outputted in units of pixel rows into digital signals on a per-pixel-column basis. That is, the analog-to-digital conversion section 13 is a column-parallel-type analog-to-digital conversion section in which the plurality of analog-to-digital converters 131 are disposed in parallel in correspondence with the pixel columns.

As the analog-to-digital converter 131, a well-known analog-to-digital converter is usable. Specifically, examples of the analog-to-digital converter 131 may include a single slope analog-to-digital converter, a successive approximation analog-to-digital converter, or a delta-sigma modulation ($\Delta\Sigma$ modulation) analog-to-digital converter, which are examples of a reference signal comparison analog-to-digital converter. However, the analog-to-digital converter is not limited thereto.

In the analog-to-digital conversion section 13, the analog-to-digital converter 131 may be disposed in a one-to-one relationship with a pixel column, that is, may be disposed on a per-pixel-column basis, or one analog-to-digital converter may be disposed for a plurality of pixel columns.

The latch buffer section 14 is disposed at a subsequent stage of the analog-to-digital converter 131. The latch buffer section 14 includes an assembly of a plurality of latch circuits 141 provided in correspondence with the respective vertical signal lines $32_1$ to $32_n$, and latches analog-to-digital converted pixel data during a period over which the pixel signal from each of the pixels 20 in the pixel array section 11 is read out.

One-row pixel data latched by each of the latch circuits 141 of the latch buffer section 14 is supplied to the image processor 16A and, after being subjected to predetermined image processing at the image processor 16A, is led out as a full-screen image output through the output interface section 17. The pixel data outputted from the latch buffer section 14 is further supplied directly to the horizontal region-of-interest cutting section 15 and the region-of-interest detector 18.

The region-of-interest detector 18 detects a specific region in the captured image as a region of interest (ROI) or a region of attention from the content of the image on the basis of the pixel data outputted from the latch buffer section 14. For example, the region-of-interest detector 18 can detect a region having motion in the captured image as the region of interest (region of attention) by using a well-known technique of motion detection. However, techniques for detecting the region of interest are not limited to the technique of motion detection.

In a case of using the technique of motion detection, it is necessary to hold image information preceding by at least one imaging frame. Therefore, the region-of-interest detector 18 incorporates an image memory storing the image information corresponding to at least one imaging frame. On the basis of a result of comparison between the image information of a current imaging frame and the image information preceding by at least one imaging frame held in the image memory, the region-of-interest detector 18 detects a region having motion in the captured image as a region of interest, and supplies region-of-interest information thereof to the second pixel control section 19B. Details of the region-of-interest detector 18 using the technique of motion detection will be described later.

On the basis of a result of detection by the region-of-interest detector 18, the horizontal region-of-interest cutting section 15 performs cutting of the region of interest in the horizontal direction (row direction) for one-row pixel data in a manner like a ROI portion illustrated in FIG. 1. It is possible to cut down data amount by employing a configuration where cutting in the horizontal direction is performed in such a manner. In the horizontal region-of-interest cutting section 15, the pixel data having undergone the cutting in the horizontal direction is subjected to predetermined image processing at the image processor 16A, and is thereafter led out as a ROI image output through the output interface section 17.

Note that the cutting in the horizontal direction may be executed not only by the horizontal region-of-interest cutting section 15 disposed at a subsequent stage of the latch buffer section 14 but also by reading out data of only the ROI portion when reading out data from the latch buffer section 14. Further, depending on the purpose of use of the imaging device 10, the cutting in the horizontal direction may be omitted.

The first pixel control section 19A performs control to read out signals of all the pixels 20 in the pixel array section 20 at the first frame rate on the basis of various timing signals, clock signals, control signals, etc. The second pixel control section 19B performs control to select a pixel row on the basis of the region-of-interest information, which is the result of detection by the region-of-interest detector 18, and to read out signals of the pixels 20 in the pixel row including the specific region ROI in the pixel array section 11 at the second frame rate (that is, the high frame rate) higher than the first frame rate.

With the imaging device 10 of the above-described configuration, it is possible to obtain an image that is imaged through a lens (not illustrated). In addition, it is possible to obtain an image of one screen by, under driving by the row selector 12, reading out the signals of the pixels 20 in the pixel array section 11 on a per-pixel-row basis, subjecting the signals to analog-to-digital conversion at the analog-to-digital conversion section 13, performing latching at each of the latch circuits 141 of the latch buffer section 14, and performing outputting sequentially.

The pixel row from which the pixel signals are read out has an address, which is, on the circuit, a row address incremented from bottom to top in the drawing. Typically, a Kepler lens is used as the lens described above, and the image becomes a mirror image. Therefore, on the precondition that the image becomes a mirror image, a lower portion on the circuit is to be located in a higher portion on the image, and the row address is to be incremented from top to bottom on the image.

It is a feature of the imaging device 10 according to the present embodiment described above that a plurality of pixel control sections is mounted thereon, including the first pixel control section 19A that performs control to read out the signals of all the pixels 20 in the pixel array section 11 at the first frame rate, and the second pixel control section 19B that performs control to read out the signals of the pixels 20 in the specific region ROI in the pixel array section 11 at the second frame rate.

In the imaging device 10 according to the present embodiment, the horizontal region-of-interest cutting section 15 and the region-of-interest detector 18, in addition to the first pixel control section 19A and the second pixel control section 19B, are additional circuits over a typical imaging device (e.g., a CMOS image sensor). These additional circuits are to be mounted as logic circuits, and are therefore able to benefit from process miniaturization, thus resulting in only a small difference in circuit scale. Note that FIG. 4 is a conceptual diagram illustrating a system configuration of the imaging device 10 according to the present embodiment. Specific examples of the pixel array section 11, the analog-to-digital conversion section 13, and the latch buffer section 14 will be described later.

For the imaging device 10 having the above-described configuration, as a chip structure including a single chip, a so-called flat structure may be employed, or a so-called stacked structure may be employed.

Here, the flat structure is a chip structure where the peripheral circuit section on the periphery of the pixel array section 11 is formed on the same semiconductor substrate (semiconductor chip) as the pixel array section 11. In other words, in the flat structure, the row selector 12, the analog-to-digital conversion section 13, the latch buffer section 14, the horizontal region-of-interest cutting section 15, the image processors 16A and 16B, the output interface section 17, the region-of-interest detector 18, the first pixel control section 19A, and the second pixel control section 19B are formed on the same semiconductor substrate as the pixel array section 11.

Further, the stacked structure is a chip structure where the peripheral circuit section on the periphery of the pixel array section 11 is formed on at least one semiconductor substrate different from a semiconductor substrate on which the pixel array section 11 is formed. According to the imaging device 10 of the stacked structure, it is sufficient that the semiconductor substrate in the first layer has such a size (area) that the pixel array section 11 is formable thereon, and therefore it is possible for the size (area) of the semiconductor substrate in the first layer, and eventually the entire chip size, to be small. Furthermore, because it is possible to apply a process suitable for fabrication of the pixels 20 to the semiconductor substrate in the first layer, and to apply a process suitable for fabrication of the circuit portions to the other semiconductor substrate, there also is an advantage that process optimization is achievable in manufacturing the imaging device 10.

[Circuit Configuration of Pixel]

Figure 5:
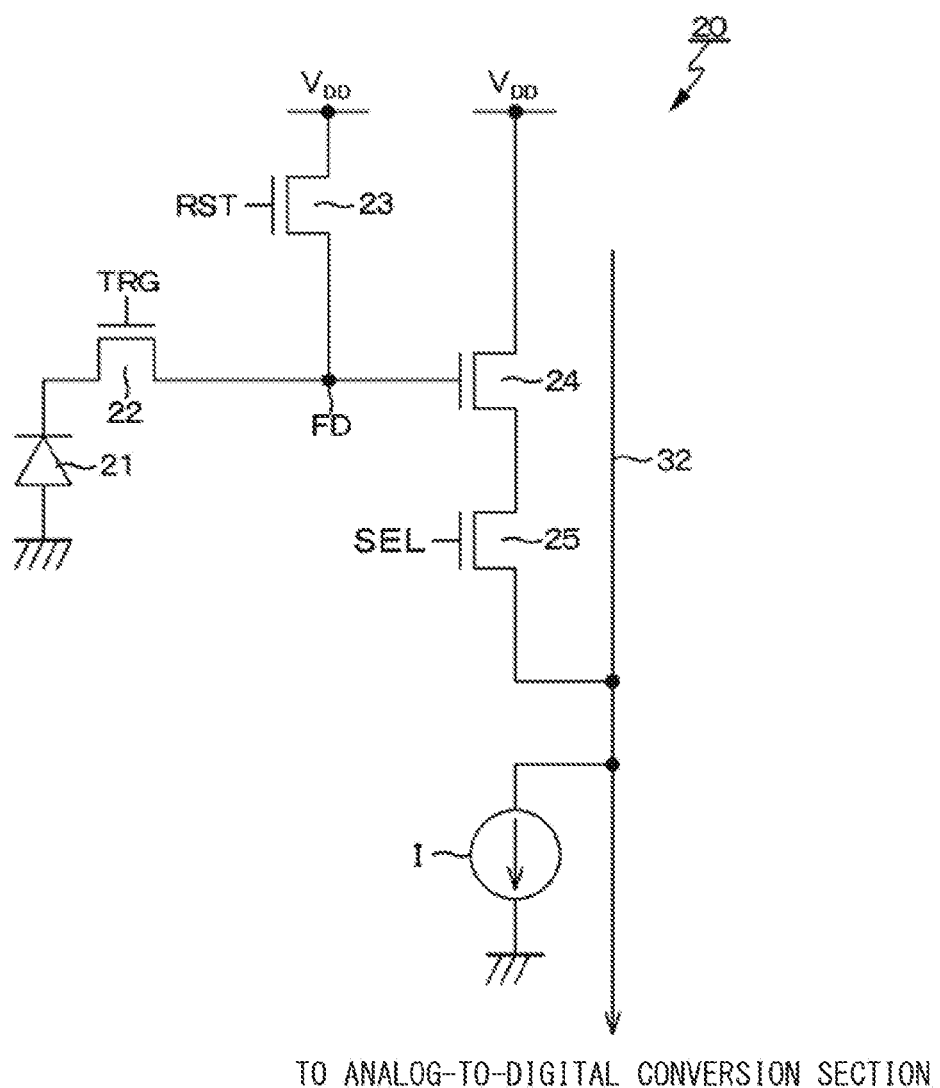
FIG. 5 is a circuit diagram illustrating an example of a circuit configuration of a pixel.

FIG. 5 is a circuit diagram illustrating an example of a circuit configuration of the pixel 20. The pixel 20 has a circuit configuration including, for example, a photodiode 21 as a photoelectric converter, and including, in addition to the photodiode 21, a transfer transistor 22, a reset transistor 23, an amplification transistor 24, and a selection transistor 25.

It is to be noted that N-channel MOS field-effect transistors, for example, are used here as the four transistors including the transfer transistor 22, the reset transistor 23, the amplification transistor 24, and the selection transistor 25; however, the combination of electric conduction types of the four transistors 22 to 25 exemplified here is merely one example, and such a combination is thus non-limiting.

For the pixels 20, a plurality of pixel drive lines serving as the pixel drive lines 31 described above is wired in common to the pixels 20 in the same pixel row. The plurality of pixel drive lines is coupled, on a per-pixel-row basis, to output ends of the row selector 12 corresponding to the respective pixel rows. The row selector 12 outputs a transfer signal TRG, a reset signal RST, and a selection signal SEL appropriately to the plurality of pixel drive lines.

The photodiode 21 has an anode electrode coupled to a low-potential-side power supply (e.g., ground). The photodiode 21 photoelectrically converts received light into photoelectric charge (in this example, photoelectrons) of a charge amount corresponding to the light amount, and accumulates the photoelectric charge. The photodiode 21 has a cathode electrode electrically coupled to a gate electrode of the amplification transistor 24 via the transfer transistor 22. Here, a region where the gate electrode of the amplification transistor 24 is electrically coupled is a floating diffusion (floating diffusion region or impurity diffusion region) FD. The floating diffusion FD is an electric charge-to-voltage conversion section that converts electric charge into a voltage.

The transfer signal TRG that becomes active at a high level (e.g., a $V_{DD}$ level) is supplied from the row selector 12 to a gate electrode of the transfer transistor 22. The transfer transistor 22 comes into conduction in response to the transfer signal TRG, and thereby transfers the photoelectric charge resulting from photoelectric conversion at the photodiode 21 and accumulated in the photodiode 21 to the floating diffusion FD.

The reset transistor 23 is coupled between a node of a high-potential-side power supply $V_{DD}$ and the floating diffusion FD. The reset signal RST that becomes active at a high level is supplied from the row selector 12 to a gate electrode of the reset transistor 23. The reset transistor 23 comes into conduction in response to the reset signal RST, and resets the floating diffusion FD by discarding the electric charge of the floating diffusion FD to the node of the voltage $V_{DD}$.

The amplification transistor 24 has the gate electrode coupled to the floating diffusion FD and a drain electrode coupled to the node of the high-potential-side power supply $V_{DD}$. The amplification transistor 24 serves as an input section of a source follower that reads out a signal obtained by photoelectric conversion at the photodiode 21. In other words, the amplification transistor 24 has a source electrode coupled to the vertical signal line 32 via the selection transistor 25. In addition, the amplification transistor 24 and the current source I coupled to one end of the vertical signal line 32 constitute a source follower that converts the voltage of the floating diffusion FD into a potential of the vertical signal line 32.

The selection transistor 25 has a drain electrode coupled to the source electrode of the amplification transistor 24, and a source electrode coupled to the vertical signal line 32, for example. The selection signal SEL that becomes active at a high level is supplied from the row selector 12 to a gate electrode of the selection transistor 25. The selection transistor 25 comes into conduction in response to the selection signal SEL, and thereby brings a unit pixel 2 into a selected state to allow a signal outputted from the amplification transistor 24 to be transferred to the vertical signal line 32.

It is to be noted that although a 4Tr circuit configuration including the transfer transistor 22, the reset transistor 23, the amplification transistor 24, and the selection transistor 25, that is, including four transistors (Trs), is described here as an example of a pixel circuit of the pixel 20, the pixel circuit is not limited to the 4Tr circuit configuration. Further, as a pixel structure, assuming that a substrate surface on a side on which a wiring layer is provided is a front surface (front), a back-illuminated pixel structure that captures illumination light from a back surface side opposite to the front surface may be employed, or a front-illuminated pixel structure that captures illumination light from the front surface side may be employed.

As described above, the imaging device 10 according to the present embodiment includes the region-of-interest detector 18 that detects the specific region ROI in the pixel array section 11 as a region of interest. In addition, it is a feature of the imaging device 10 according to the present embodiment that, under the control of the first pixel control section 19A and the second pixel control section 19B, while the signals of all the pixels 20 in the pixel array section 11 are read out at the first frame rate, the signals of the pixels 20 in the specific region ROI detected by the region-of-interest detector 18 as the region of interest are read out at the second frame rate higher than the first frame rate.

In the following, the first frame rate will be described as a low frame rate, and the second frame rate will be described as a high frame rate.

According to the imaging device 10 of the present embodiment described above, it is possible to obtain the following workings and effects.

- By virtue of the output of a full screen image and the output at the high frame rate of an image of a specific region ROI (ROI image), it is possible to achieve an imaging device (e.g., CMOS image sensor) that is highly utilizable in AI and recognition techniques.
- With respect to Other Approach 1 described above, it is possible to resolve the problem of parallax and achieve a reduction in manufacturing cost because acquisition of the full screen image and acquisition of the ROI image are achievable on a single pixel array section 11.
- With respect to Other Approaches 2 and 3 described above, it is possible to greatly reduce the manufacturing cost, power consumption, and heat generation.
- Because the technology of existing typical imaging devices (e.g., CMOS image sensors) is used for many parts, designing at very low development cost is achievable.
- Because the analog-to-digital converters that are large in circuit design cost, power consumption, circuit size, etc. are operated with high efficiency to obtain output images, it is possible to provide a highly efficient imaging device.
- Because the imaging device performs from detection to control of the specific region (region of interest) ROI, no special processing is necessary on the controller side disposed at a subsequent stage, and a control burden on the controller is thus low.

The following will describe specific examples of the present embodiment where the signals of all the pixels 20 in the pixel array section 11 are read out at the low frame rate and the signals of the pixels 20 in the specific region ROI in the pixel array section 11 are read out at the high frame rate.

Example 1

Figure 6:
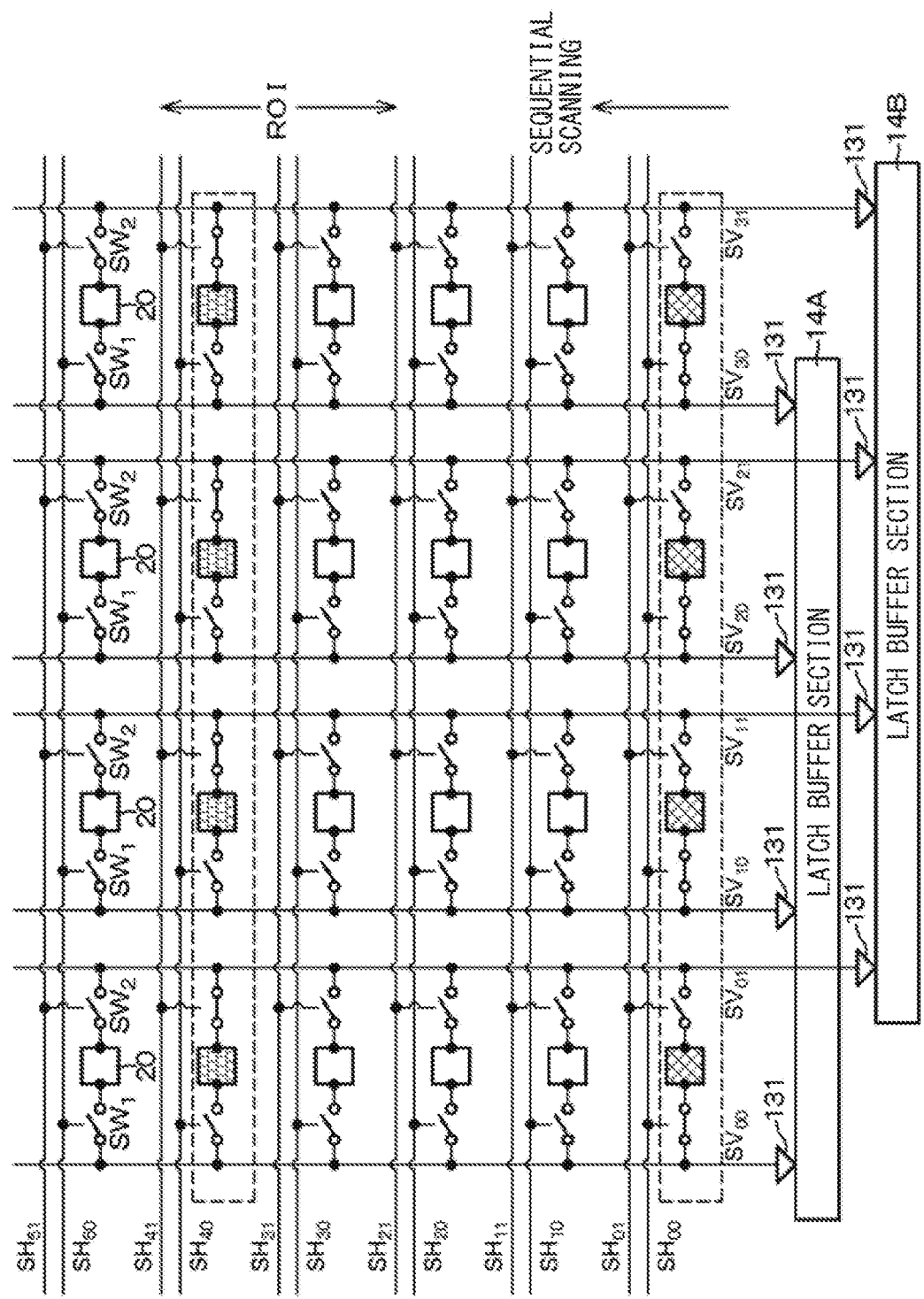
FIG. 6 is a circuit diagram illustrating a circuit configuration of an analog section according to Example 1.

Example 1 is a circuit configuration example of an analog section of the imaging device 10 according to the present embodiment. A circuit configuration of the analog section according to Example 1 is illustrated in FIG. 6. FIG. 6 illustrates a specific circuit configuration of the pixel array section 11, the analog-to-digital conversion section 13, and the latch buffer section 14.

Here, for simplifying the drawing, a pixel arrangement of four pixels in the horizontal direction×six pixels in the vertical direction is illustrated as the pixel array section 11. In the pixel array section 11, two systems of readout signal lines $SV_{00}$, $SV_{01}$, . . . , and $SV_{30}$, $SV_{31}$ are wired on a per-pixel-column basis as the vertical signal lines 32, and two systems of drive lines $SH_{00}$, $SH_{01}$, . . . , and $SH_{50}$, $SH_{51}$ are wired on a per-pixel-row basis as the pixel drive lines 31. In correspondence therewith, the analog-to-digital converters 13 are also provided in two systems. Furthermore, the latch buffer sections 14 are also provided in two systems, that is, as a latch buffer section 14A for the full screen image and a latch buffer section 14B for the ROI image.

Further, two switches $SW_1$ and $SW_2$ are provided for each of the pixels 20. One of the switches $SW_1$ is coupled between the readout signal lines $SV_{00}$, . . . , and $SV_{30}$ on one side and the pixel 20, and the other switch $SW_2$ is coupled between the readout signal lines $SV_{01}$, . . . , and $SV_{31}$ on the other side and the pixel 20. The two switches $SW_1$ and $SW_2$ are subjected to on (close)/off (open) control by control signals supplied through the two systems of drive lines $SH_{00}$, $SH_{01}$, . . . , and $SH_{50}$, $SH_{51}$.

In reading out the signals of all the pixels 20 in the pixel array section 11, one of the switches $SW_1$ is turned on in units of the selected pixel row, as illustrated in the first pixel row in FIG. 6. The signals of the pixels 20 in the selected pixel row are thereby read out to the readout signal lines $SV_{00}$, . . . , and $SV_{30}$ on one side by the switch $SW_1$. Then, the pixel signals read out by the switch $SW_1$ are subjected to digital-to-analog conversion by the analog-to-digital converters 131 and thereafter latched by the latch circuits 141 of the latch buffer section 14A for the full screen image.

In reading out the signals of the pixels 20 in the specific region ROI in the pixel array section 11, the other switch $SW_2$ is turned on in units of the selected pixel row, as illustrated in the fifth pixel row in FIG. 6. The signals of the pixels 20 in the selected pixel row are thereby read out to the readout signal lines $SV_{01}$, . . . , and $SV_{31}$ on the other side by the switch $SW_2$. Then, the pixel signals read out by the switch $SW_2$ are subjected to digital-to-analog conversion by the analog-to-digital converters 131 and thereafter latched by the latch circuits 141 of the latch buffer section 14B for the ROI image.

As described above, the analog section according to Example 1 has a configuration in which the pixel array section 11 has the two systems of readout signal lines SV on a per-pixel-column basis as the vertical signal lines 32, and the two systems of drive lines SH on a per-pixel-row basis as the pixel drive lines 31. By having two systems each of the readout signal lines SV and the drive lines SH, it is possible to read out the signals of all the pixels 20 in the pixel array section 11 and the signals of the pixels 20 in the specific region ROI concurrently (at the same time) under the control by the first pixel control section 19A and the second pixel control section 19B.

The readout control in the analog section according to Example 1 will be described through the use of a timing waveform chart of FIG. 7.

The control signals supplied through the two systems of drive lines $SH_{00}$, $SH_{01}$, . . . , and $SH_{50}$, $SH_{51}$ control the pixel rows from which the pixel signals are to be read out. The control signals turn on the switch $SW_1/SW_2$ by becoming High (high level), and thereby cause the pixel signals to be read out and subjected to analog-to-digital conversion. In order to perform reading out of two pixel rows in response to driving of one pixel row, the control signals at two locations are made High.

Figure 7:
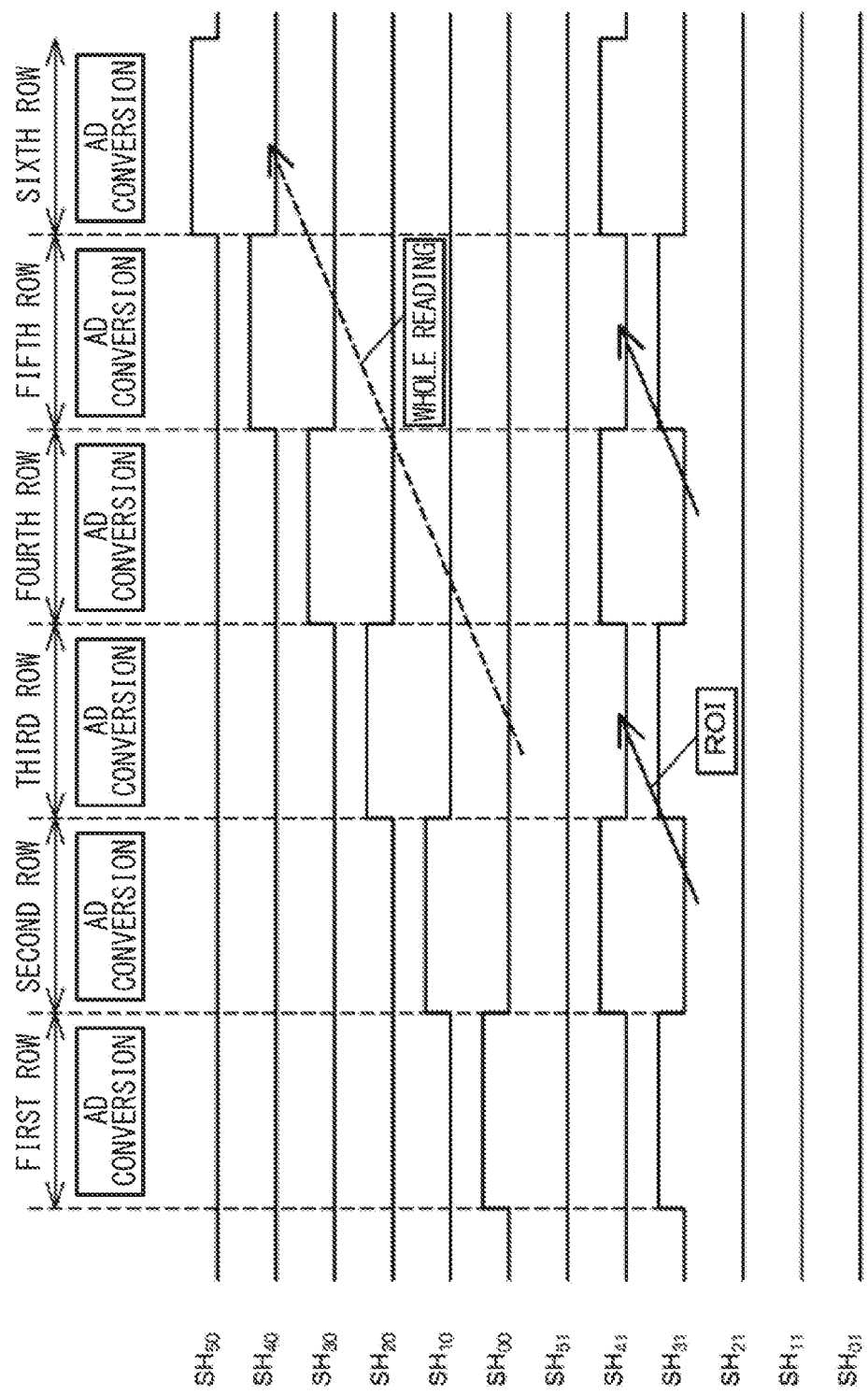
FIG. 7 is a timing waveform chart describing readout control in the analog section according to Example 1.

In the timing waveform chart of FIG. 7, the operation represented by the dashed arrow is an operation of reading out the signals of all the pixels 20 in the pixel array section 11. In this example, control in the order from the first row to the sixth row is executed repeatedly. By this operation, it is possible to acquire the signals of all the pixels 20 in the pixel array section 11, that is, full screen image data.

In the timing waveform chart of FIG. 7, the operation represented by the solid arrow assumes an operation of reading out the signals of the pixels 20 in the specific region ROI in the pixel array section 11. In the example of FIGS. 6 and 7, the readout operation is executed repeatedly on the third and fourth rows as the pixel rows in the specific region ROI. A cycle of the repetitive operation of reading out the ROI image represented by the solid arrow is faster than that in the case of reading out the full screen image represented by the dashed arrow. It is thereby possible to obtain the ROI image with a high frame rate.

Example 2

Figure 8:
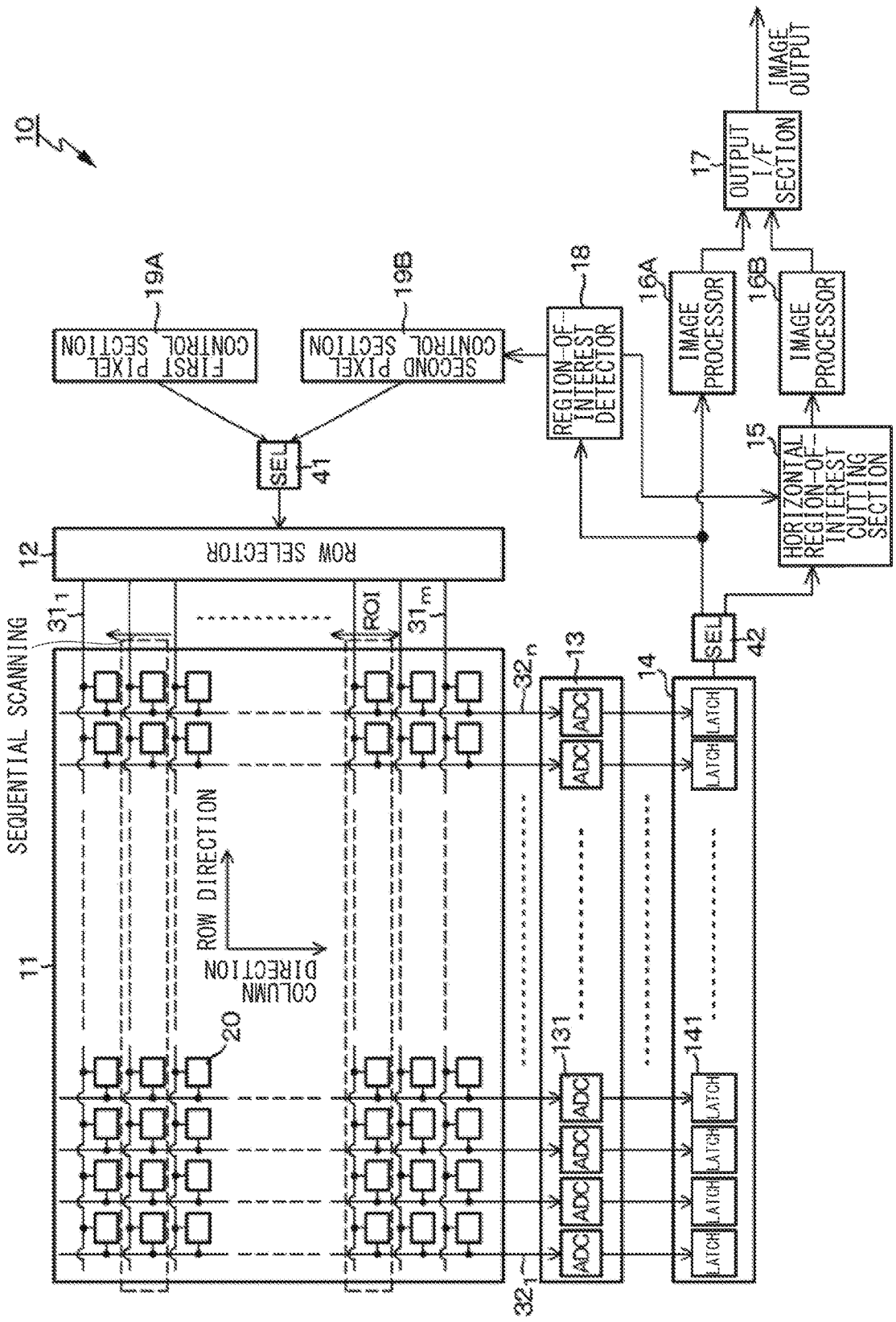
FIG. 8 is a configuration diagram illustrating a system configuration of an imaging device according to Example 2.
Figure 9:
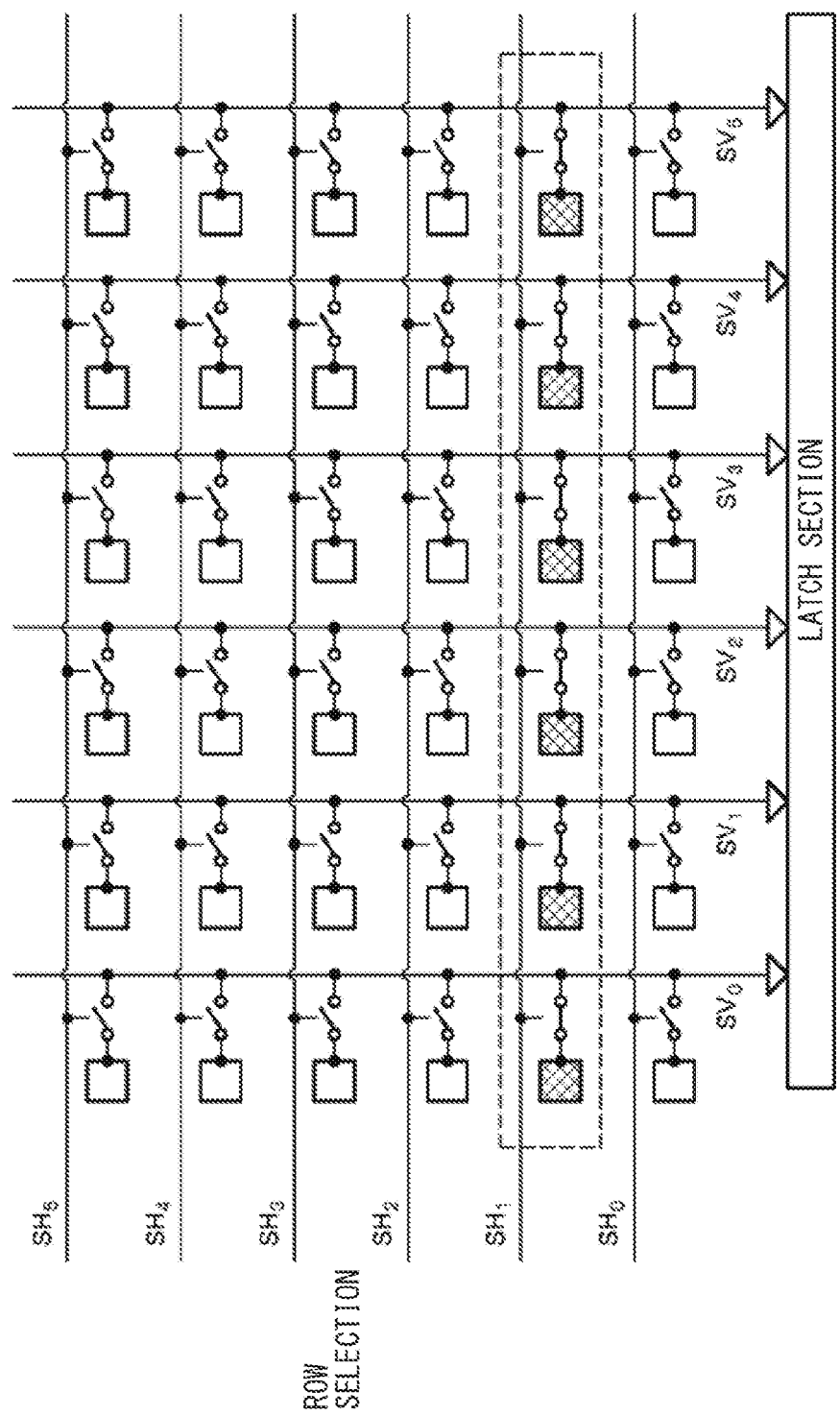
FIG. 9 is a circuit diagram illustrating a circuit configuration of an analog section for achieving readout driving for a full screen image.
Figure 10:
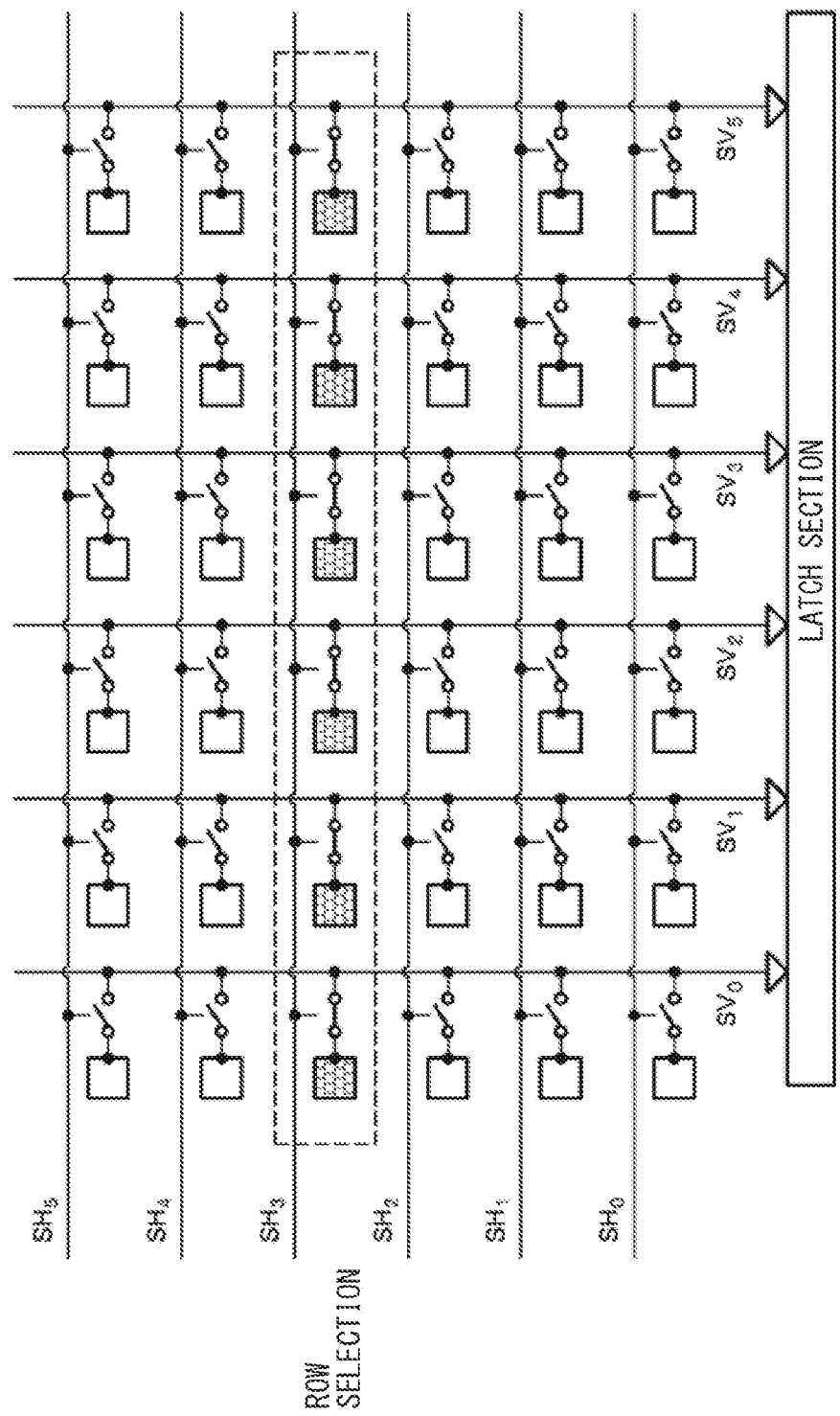
FIG. 10 is a circuit diagram illustrating a circuit configuration of an analog section for achieving readout driving for a ROI image.

Example 2 is an example where acquisition of the full screen image and acquisition of the ROI image are performed by time-division driving. A system configuration of an imaging device according to Example 2 achieving the time-division driving is illustrated in FIG. 8. Further, regarding the imaging device according to Example 2, a circuit configuration of an analog section for achieving readout driving for the full screen image is illustrated in FIG. 9, and a circuit configuration of an analog section for achieving readout driving for the ROI image is illustrated in FIG. 10. Here, for simplifying the drawing, a pixel arrangement of six pixels in the horizontal direction×six pixels in the vertical direction is illustrated as the pixel array section 11.

Example 1 has a configuration in which, as illustrated in FIG. 6, the two switches $SW_1$ and $SW_2$ are provided for each of the pixels 20, and two systems each of the vertical signal lines 32 (readout signal lines SV), pixel drive lines 31 (drive lines SH), analog-to-digital converters 13, and latch buffer sections 14 are provided.

In contrast, Example 2 has a configuration in which, as illustrated in FIGS. 8 to 10, one switch SW is provided for each of the pixels 20, and one system each of the vertical signal line 32 (readout signal line SV), pixel drive line 31 (drive line SH), analog-to-digital conversion section 13, and latch buffer section 14 is provided. Although FIG. 8 illustrates one-line (one-row) control, simultaneous control with a plurality of lines may be employed as in a typical imaging device.

As with Example 1, the imaging device 10 according to Example 2 includes the first pixel control section 19A and the second pixel control section 19B, and their control is switchable by using a selector 41. In correspondence therewith, a selector 42 is also provided at a subsequent stage of the latch buffer section 14 to allow the selector 42 to switch a supply destination of the pixel data outputted from the latch buffer section 14. Then, the selector 41 and the selector 42 perform, in conjunction with each other, the switching operations alternately in terms of time to read out respective pieces of pixel data of the full screen image and the ROI image in a time division manner in units of two-time analog-to-digital conversions.

Thus, in the imaging device 10 according to Example 2, respective pieces of pixel data of the full screen image and the ROI image are read out in a time division manner by switching therebetween alternately in terms of time under the control of the first pixel control section 19A and the second pixel control section 19B. This makes it possible to acquire multiple images simultaneously on a per-screen basis. Note that in the case of Example 2, the operations of reading out both pieces of pixel data are performed in units of two-time analog-to-digital conversions, and therefore the operation speed is half that in the case of Example 1. The operation principle is the same as that of Example 1.

The imaging device 10 according to Example 2 is able to achieve reading out of pixel data of both of the full screen image and the ROI image without changing the analog circuit portions including the pixel array section 11, the analog-to-digital conversion section 13, the latch buffer section 14, etc. Thus, there is an advantage that a necessary amount of development is smaller.

The circuit configurations of the analog section in FIGS. 9 and 10 are the same as the circuit configuration of a typical imaging device, allowing for reading out of pixel data at one location at one time. Regarding the pixel arrangement of six pixels in the horizontal direction×six pixels in the vertical direction, in FIG. 9, the first row is a pixel row targeted for reading out of the full screen image, and in FIG. 10, the fourth row is a pixel row targeted for reading out of the ROI image.

In the example illustrated in FIGS. 9 and 10, one readout signal line SV as the vertical signal line 32 is wired on a per-pixel-column basis; however, as in the case of a typical imaging device, a plurality of readout signal lines SV may be wired on a per-pixel-column basis for the purpose of achieving higher speed.

Figure 11:
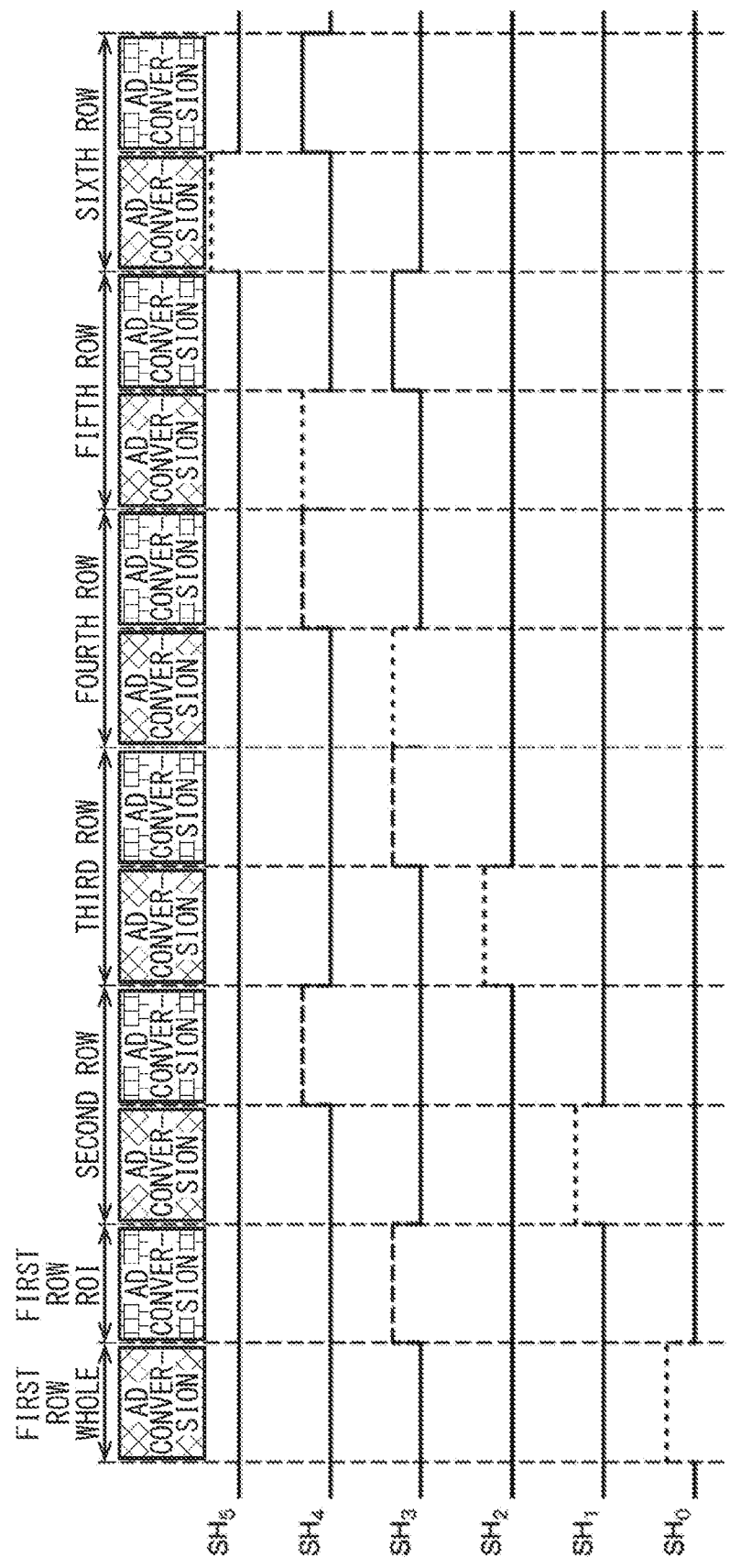
FIG. 11 is a timing waveform chart describing readout driving for a full screen image and readout driving for a ROI image of the imaging device according to Example 2.

The readout driving for the full screen image (FIG. 9) and the readout driving for the ROI image (FIG. 10) in the imaging device 10 according to Example 2 will be described through the use of a timing waveform chart of FIG. 11. In the timing waveform chart of FIG. 11, waveforms of control signals supplied through the drive lines $SH_0, \ldots,$ and $SH_5$ are illustrated.

In this example, acquisition of the full screen image and acquisition of the ROI image are switched on a per-row basis. In the timing waveform chart of FIG. 11, for acquisition of the full screen image, a waveform of a control signal being represented by a dotted line, respective pieces of pixel data of the first to sixth pixel rows are acquired sequentially and this operation is executed repeatedly. For acquisition of the ROI image, a waveform of a control signal being represented by a broken line, respective pieces of pixel data of the third and fourth pixel rows are acquired repeatedly. This causes the acquisition cycle for the full screen image and the acquisition cycle for the ROI image to be different from each other, allowing for image acquisition at a high frame rate in the case of acquiring the ROI image relative to the case of acquiring the full screen image.

Example 3

Figure 12:
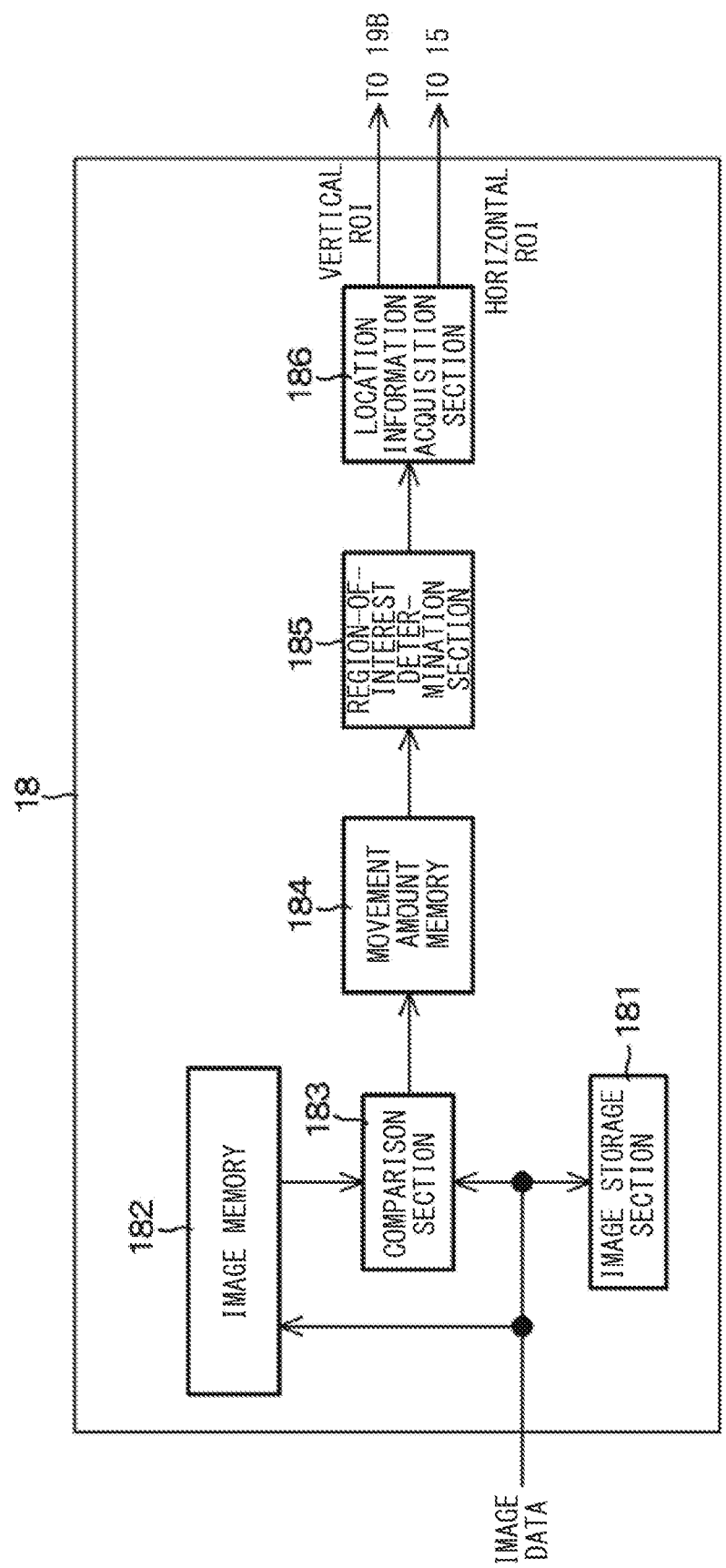
FIG. 12 is a block diagram illustrating an example of a circuit configuration of a region-of-interest detector according to the Example 3.

Example 3 is an example of a circuit configuration of the region-of-interest detector 18 that uses the technique of motion detection in detecting the region of interest. FIG. 12 illustrates an example of the circuit configuration of the region-of-interest detector according to Example 3. Further, FIGS. 13A, 13B, 13C and 13D 13A to 13D) illustrates a conceptual diagram of detection of the region of interest by using the technique of motion detection. In the following, the specific region ROI will be described as a region of interest ROI.

The region-of-interest detector 18 has a configuration including an image storage section 181, an image memory 182, a comparison section 183, a movement amount memory 184, a region-of-interest determination section 185, and a location information acquisition section 186.

Figure 13A:
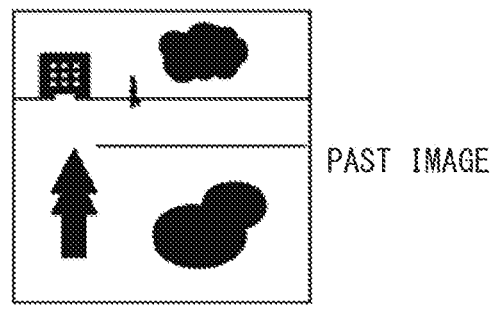
FIGS. 13A, 13B, 13C, and 13D are conceptual diagrams regarding detection of a region of interest by using a technique of motion detection.

Image data that is read out from each of the pixels 20 of the pixel array section 11, subjected to analog-to-digital conversion at the analog-to-digital conversion section 13, and thereafter supplied through the latch buffer section 14 is stored in the image storage section 181 and supplied to the image memory 182 and the comparison section 183. In the image memory 182, image information preceding by at least one imaging frame is held as past image information (FIG. 13A).

Figure 13B:
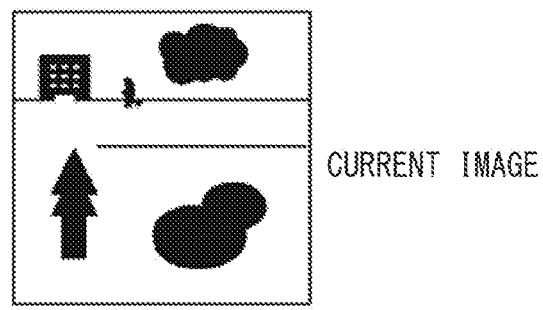
Figure 13C:
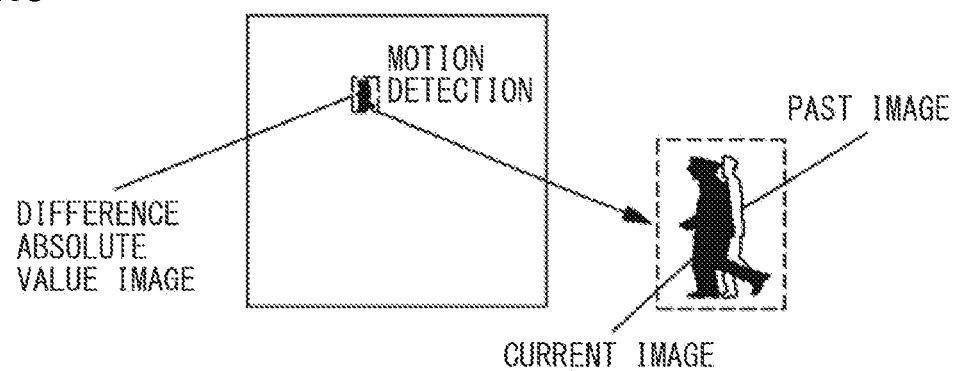

The comparison section 183 compares the past image (FIG. 13A) held in the image memory 182 and a current image (FIG. 13B) to take a difference absolute value between the same pixels, and thereby obtains a difference absolute value image (FIG. 13C). Although there is no difference between the past image and the current image in a region having no motion, there is a difference therebetween in a region having motion, and the difference is extracted. The current image information is stored in the image memory 182 for comparison operation in a next imaging frame.

The difference absolute value image (FIG. 13C) acquired by the comparison operation at the comparison section 183 is stored in the movement amount memory 184 as a movement amount from the past image (FIG. 13A) to the current image (FIG. 13B). By using a reduced image as a unit of storage and comparison of the image information, a great downsizing of the image memory 182 and circuits is achievable.

On the basis of the movement amount stored in the movement amount memory 184, the region-of-interest determination section 185 determines a portion where the movement amount is larger than a predetermined amount as having motion, and determines the portion as a region of interest ROI. At this time, an area size or the like of the portion determined as the region of interest ROI by the region-of-interest determination section 185 may be taken into consideration.

Figure 13D:
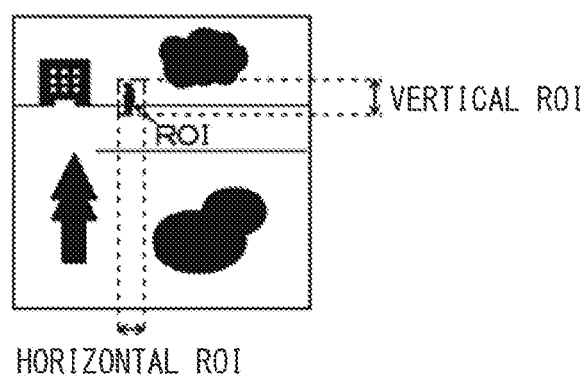

The location information acquisition section 186 acquires vertical location information of a physical location of the region determined as the region of interest ROI by the region-of-interest determination section 185 as a vertical ROI component, and acquires horizontal location information thereof as a horizontal ROI component (FIG. 13D). The vertical ROI component is supplied to the second pixel control section 19B, and the horizontal ROI component is supplied to the horizontal region-of-interest cutting section 15. The second pixel control section 19B determines a pixel row for the region-of-interest ROI on the basis of the vertical ROI component. The horizontal region-of-interest cutting section 15 determines a cutting position in the horizontal direction for the region-of-interest ROI on the basis of the horizontal ROI component.

Figure 14:
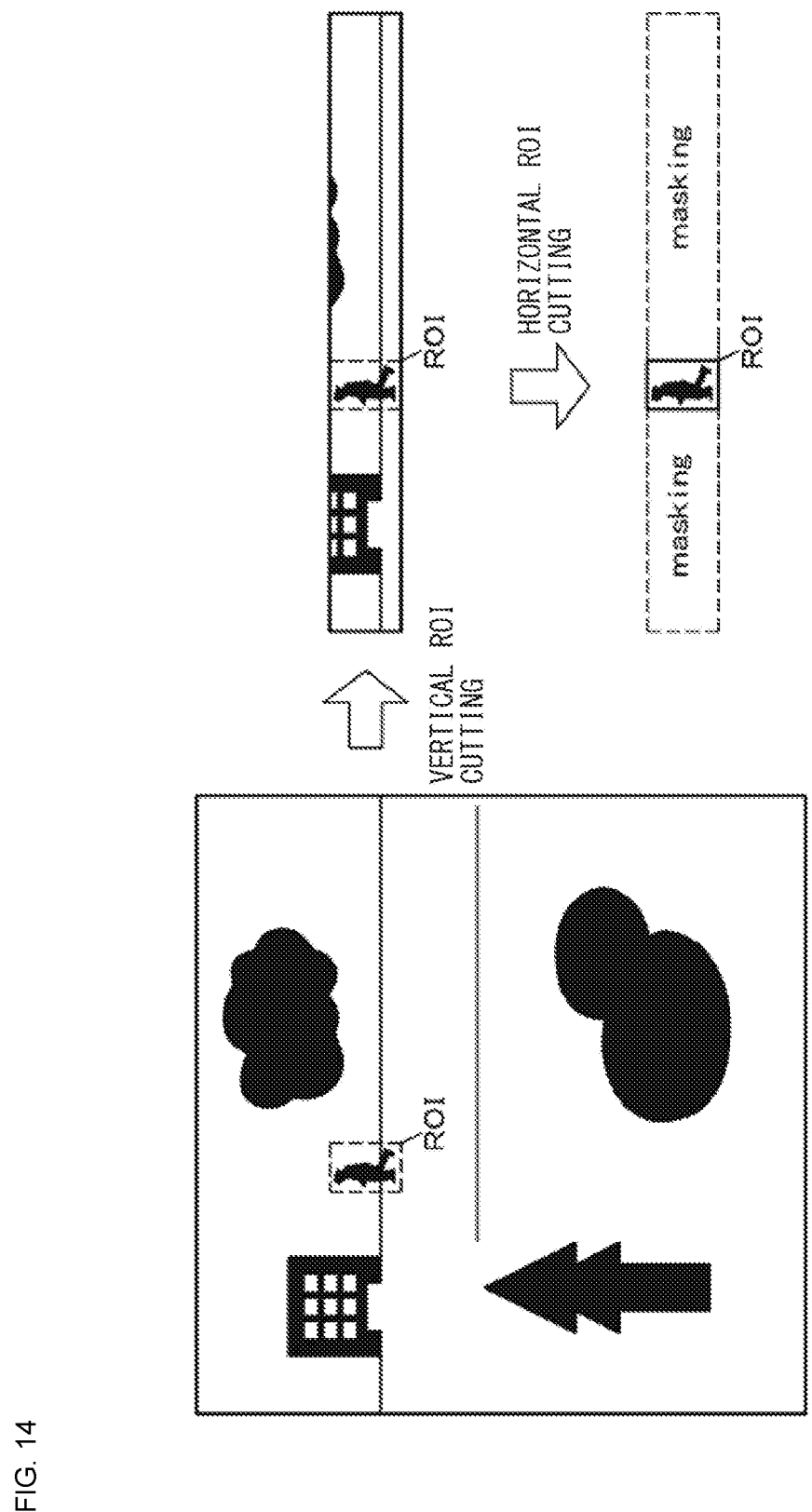
FIG. 14 is a diagram for describing a cutting process on a region of interest.

With reference to FIG. 14, a more specific description will be given of a cutting process on the region of interest ROI by the second pixel control section 19B and the horizontal region-of-interest cutting section 15.

The second pixel control section 19B executes repeatedly a readout operation on a signal of each of the pixels 20 in pixel rows in a range including the region of interest ROI on the basis of the vertical ROI component, that is, vertical address information (vertical ROI location information). As a result, as illustrated in FIG. 14, a horizontally long image including the region of interest ROI is acquired. On this horizontally long image, the horizontal region-of-interest cutting section 15 performs a process of cutting only a rectangular ROI portion and masking the other portions on the basis of the horizontal ROI component, that is, horizontal address information (horizontal ROI location information). This process by the horizontal region-of-interest cutting section 15 makes it possible to cut down an output data amount.

Example 4

Example 4 is a modification of Example 1, and is an example of address control in a case where the region of interest ROI moves in the horizontal direction (row direction). An explanatory diagram of the address control according to Example 4 is illustrated in FIG. 15.

Figure 15:
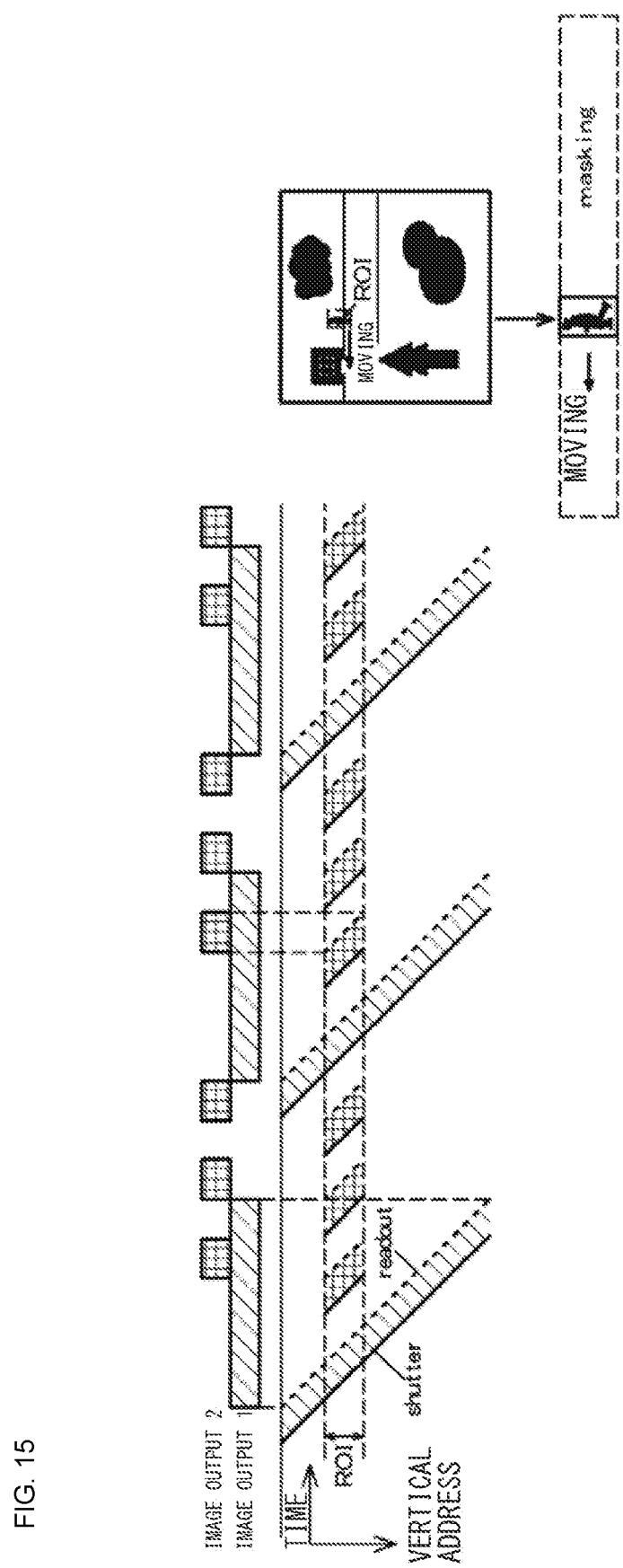
FIG. 15 is an explanatory diagram regarding address control according to Example 4.

Like the image on the right side in FIG. 15, an ROI portion is extracted by detection of a region of interest by the region-of-interest detector 18, and the vertical address information of the ROI portion is separated. The left side in FIG. 15 illustrates a diagram of time-series address control to be performed in accordance with the vertical address information. The diagram on the left side in FIG. 15 illustrates time in the horizontal direction (row direction/right direction), and illustrates the vertical address in the vertical direction (column direction/down direction). The diagram is so drawn as to coincide with the vertical direction of the image on the right side.

The imaging device 10 according to Example 1 has a configuration with two systems of analog-to-digital conversion sections 13. Here, a full-screen image output, which is an output of one of the two systems, is referred to as Image Output 1, and an ROI image output, which is an output of the other system, is referred to as Image Output 2. In the diagram on the left side in FIG. 15, data outputs of the two systems of analog-to-digital conversion sections 13 are represented by rectangles denoted as Image Output 1 and Image Output 2, respectively, together with time over which analog-to-digital conversion is performed.

In the address control on the left side in FIG. 15, a solid oblique line represents shutter (shutter) control being performed, and a dotted oblique line represents readout (readout) control being performed. A period from a shutter time to a readout time is an exposure time. The same applies to examples to be described later. An oblique parallelogram represents imaging with a constant exposure time. In order to keep the exposure time within a screen constant, the same vertical address control is performed for the shutter and the readout with time delay.

For control on Image Output 1, one cycle of control is performed from top to bottom on the screen in order to read out a full screen image, and the cycle is repeated. For control on Image Output 2, the address of the ROI portion is repeatedly controlled. The ROI portion is part of the screen, and therefore even if address control is performed at the same speed, a repetition count is higher than in the case of the readout of the full screen image. A higher frame rate is thereby achieved for the ROI portion.

An AD (analog-to-digital) conversion time for one row is fixed in a typical imaging device (e.g., a CMOS image sensor), and therefore cutting of the horizontal ROI portion does not affect the operation speed, but serves to cut down data. Therefore, it is possible to cut down data by discarding the masked portions as in the diagram in the lower right in FIG. 15.

Example 5

Figure 16:
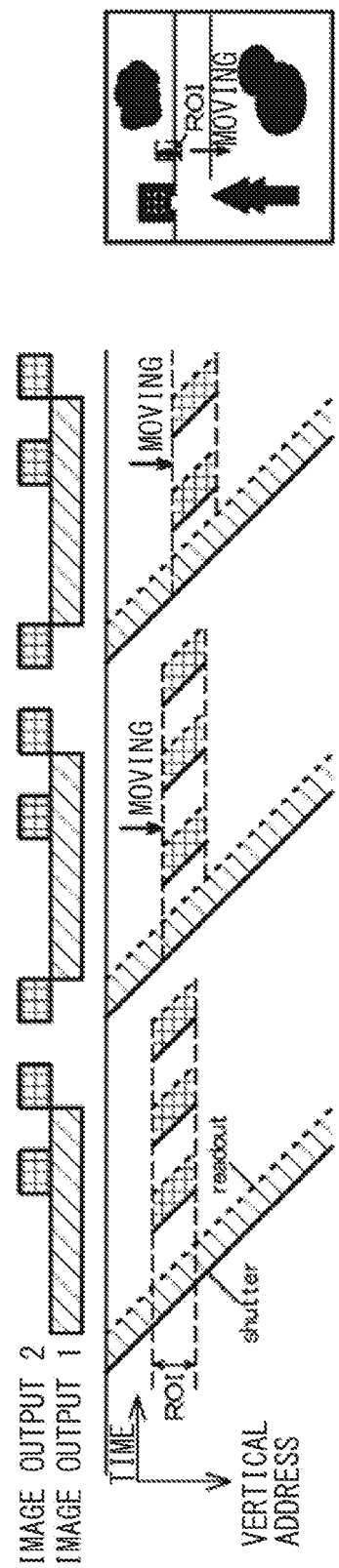
FIG. 16 is an explanatory diagram regarding address control according to Example 5.

Example 5 is a modification of Example 1, and is an example of Address Control 1 in a case where the region of interest ROI moves in the vertical direction (column direction/downward direction). An explanatory diagram of the address control according to Example 5 is illustrated in FIG. 16.

In Example 5, motion is detected by reading out the full-screen image, and the location of the region of interest ROI is confirmed and reflected in readout of the ROI image. A diagram on the left side in FIG. 16 illustrates that a readout address location of the ROI image changes as the region of interest moves in the vertical direction (column direction/downward direction) in a diagram on the right side in FIG. 16. Such address control is typical usage.

Example 6

Figure 17:
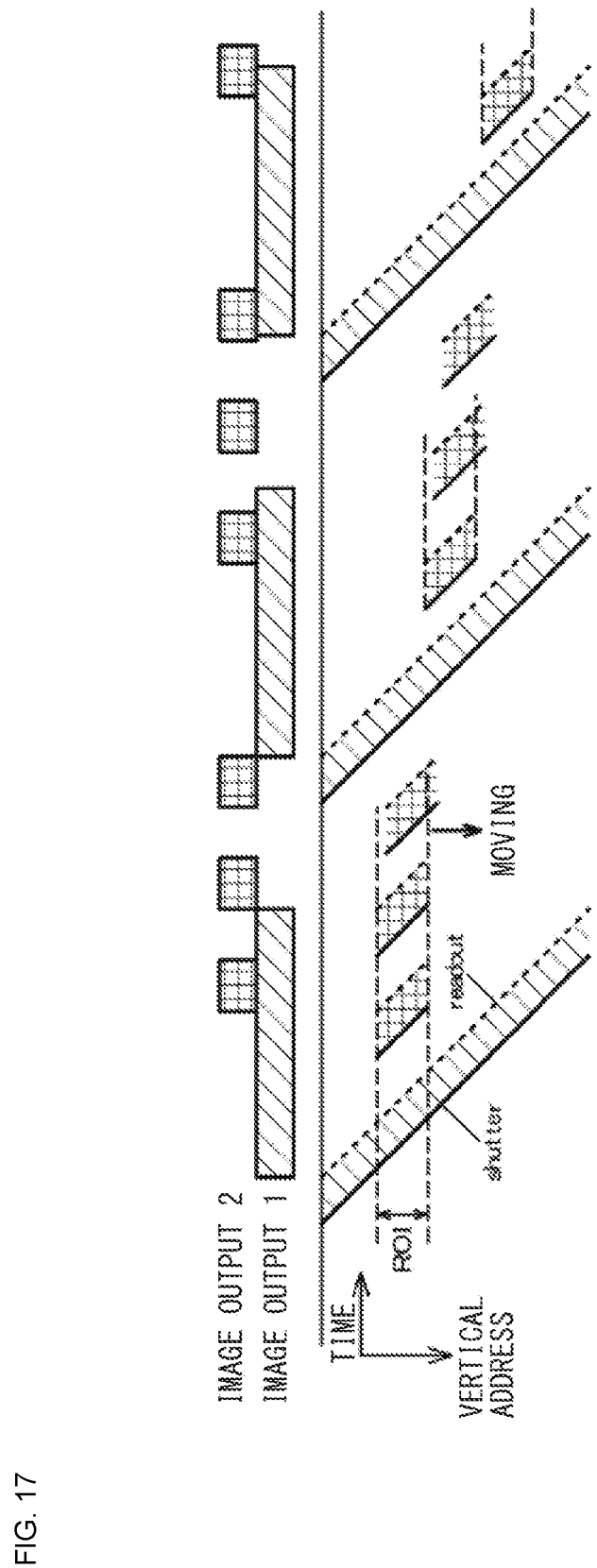
FIG. 17 is an explanatory diagram regarding address control according to Example 6.

Example 6 is a modification of Example 1, and is an example of Address Control 2 in the case where the region of interest ROI moves in the vertical direction (column direction/downward). An explanatory diagram of the address control according to Example 6 is illustrated in FIG. 17.

In Example 6, the vertical address is changed during readout driving for the region of interest ROI. This makes it possible to follow an imaging target at a higher frame rate. This following is controllable by using techniques including estimation of the location of the region of interest ROI obtained from the full screen image by differentiation of a movement vector, etc., segmentation of a movement location within a frame of the region of interest ROI, and calculation of a movement direction by centroid calculation.

Example 7

Figure 18:
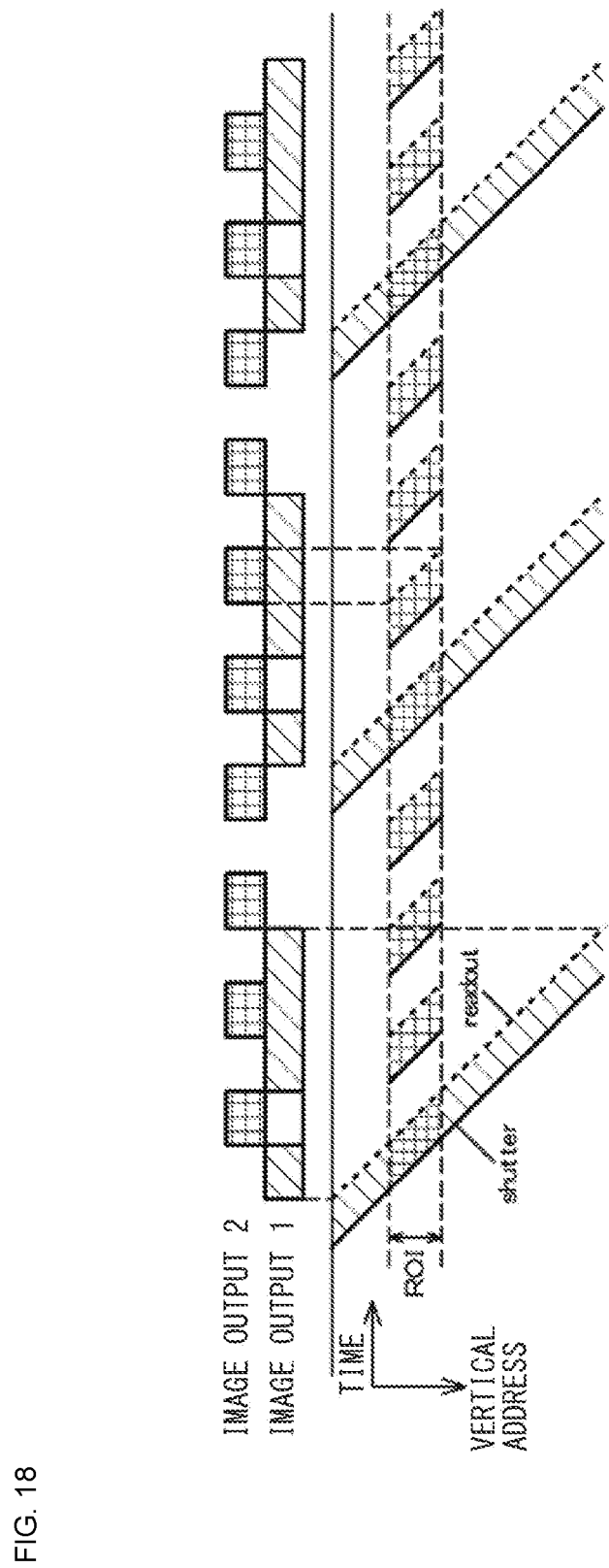
FIG. 18 is an explanatory diagram regarding address control according to Example 7.

Example 7 is a modification of Example 2, and is an example of address control as a measure against jitter. An explanatory diagram of the address control according to Example 7 is illustrated in FIG. 18.

In the case of Example 2, that is, in the case of performing acquisition of the full screen image and acquisition of the ROI image by time-division driving, the full screen image and the ROI image are read out on a per-row basis, and therefore jitter of one row occurs at exposure timing of the ROI portions of Image Output 1 and Image Output 2. Although the jitter is not problematic in many cases, an approach to taking measures against the jitter is the address control according to Example 7.

Here, a portion being controlled on side of Image Output 1 serving as the full screen image output is outputted on side of Image Output 2 serving as the ROI image output. In this way, by performing control on side of the ROI image output that enables timing generation with a fixed period, it is possible to output ROI images at fixed intervals. On the other hand, because this causes Image Output 1 to lose data of the ROI portions, there occurs a period during which no data is outputted (a blank portion in the drawing) in Image Output 1 due to measures such as padding on the output. By making up for the missing image with data on the ROI side, it is possible to obtain data of a full screen image.

The description has been given here as an example of address control to be performed using the time-division driving of Example 2; however, the address control according to Example 7 is also applicable to Example 1 involving no time-division driving.

Example 8

Figure 19:
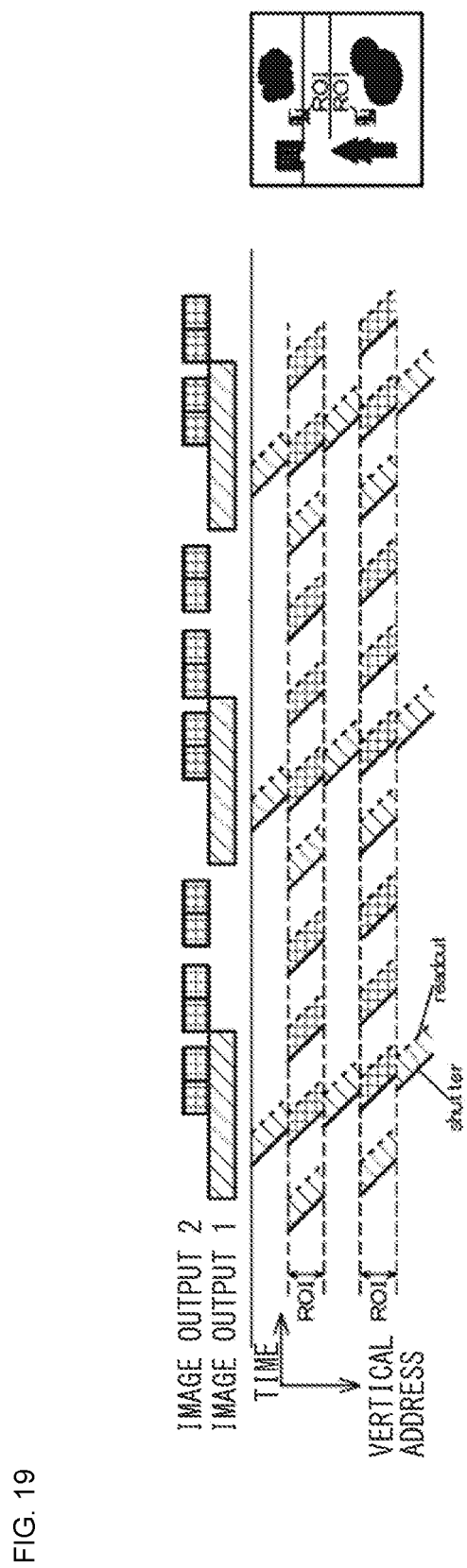
FIG. 19 is an explanatory diagram regarding address control according to Example 8.

Example 8 is an example of address control in a case where a plurality of regions of interest ROIs is present. An explanatory diagram of the address control according to Example 8 is illustrated in FIG. 19. A drawing on the right side in FIG. 19 illustrates a case where two regions of interest ROIs are present.

In the case where a plurality of regions of interest ROIs is present, locations of the plurality of regions of interest ROIs on the screen are typically away from each other. In controlling a typical imaging device (e.g., a CMOS image sensor), in the case where the locations on the screen are away from each other, if the addresses are read out sequentially from the top in accordance with reading out of the full screen image, it is necessary, in the regions of interest ROIs, to wait a length of time corresponding to pixel rows that are not to be subjected to readout. In addition, due to the presence of a period of time during which no readout is performed, the frame rate of the ROI image suffers degradation.

To cope with this, the address control according to Example 8 skips an address when reading out the ROI image. Meanwhile, the readout side for the full screen image is controlled in timed relation with the address portions of the regions of interest ROIs in order to maintain constant time intervals between readout for the full screen image and readout for the ROI image. For this reason, a change is made to the control so as not to perform sequential readout from top to bottom of the screen that would be performed in a typical imaging device. In the example of FIG. 19, control is performed to cause the Image Output 1 side, which reads out the full screen image, to read out first the same address portion as Image Output 2 which reads out the ROI image, and to thereafter read out pixels at the other addresses in order. The order is not particularly limited.

Further, because motion detection is used to detect the regions of interest ROIs and to determine the locations thereof, images other than those of the regions of interest ROIs have no motion and therefore no difference is caused in the images even if the order of readout differs from that of an imaging device that performs typical readout (e.g., CMOS image sensor). Even in a case where the regions of interest ROIs are detected using other indicators, the images are of less interest and therefore the change in the order of readout is considered to be of less interest similarly.

Example 9

Example 9 is a modification of Example 8, and is an example of address control in a case where a plurality of regions of interest ROIs moves in directions opposite to each other. An explanatory diagram of the address control according to Example 9 is illustrated in FIG. 20.

Figure 20:
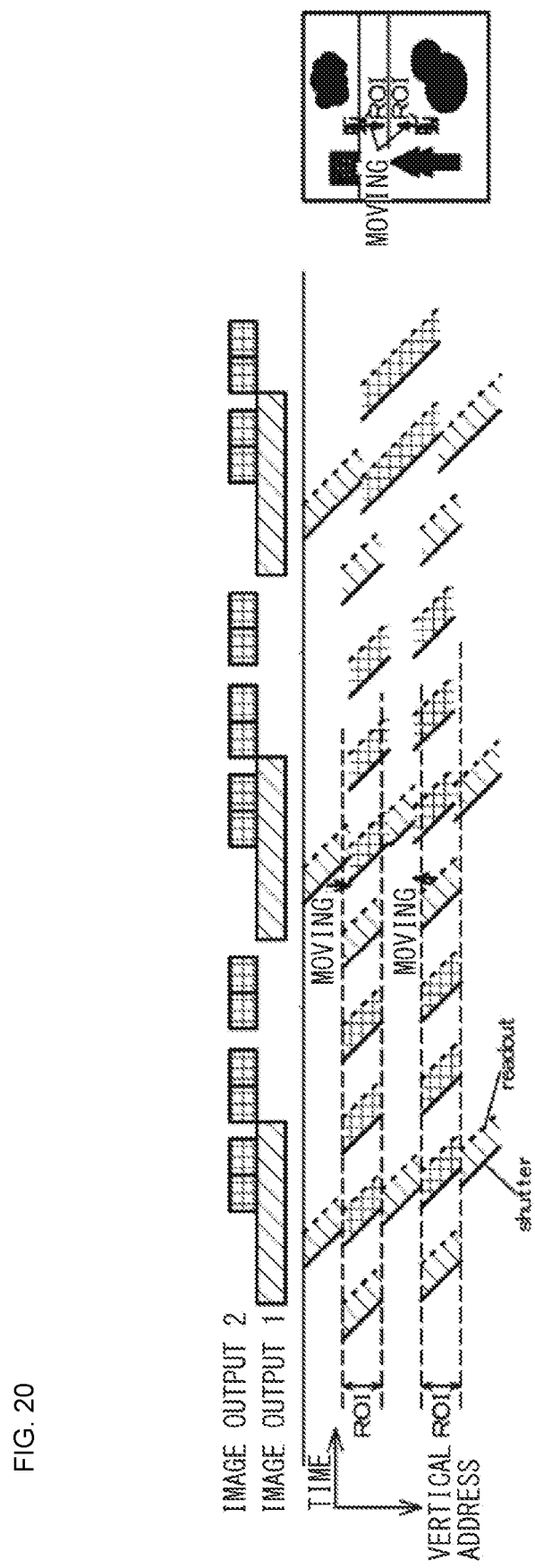
FIG. 20 is an explanatory diagram regarding address control according to Example 9.

A drawing on the right side in FIG. 20 illustrates a case where two regions of interest ROIs make movements different from each other. Specifically, the drawing illustrates that one of the regions of interest ROIs is moving vertically downward and the other is moving vertically upward.

In this case, as illustrated in a drawing on the left side in FIG. 20, in a case where the addresses for readout of the ROI images change but a total size of the two regions of interest ROIs does not change, the readout is continued while maintaining the same frame rate. For readout of the full screen image, the ROI images are read out with timings of the ROI portions maintained, and thereafter, images other than the ROI images are read out. Because the size of the full screen image does not change, it is possible to maintain the same timing all the time.

Here, the description has been given of the case where the total size of the two regions of interest ROIs does not change. To cope with a case where the size changes, the following two approaches are possible. One of the approaches is that, with the two regions of interest ROIs defined as one unit, a maximum size is set between repetitions of readout of one unit of ROI images, and in a case where the regions of interest ROIs become small, a time margin is prepared to maintain a constant frame rate. The other approach is to change the frame rate in accordance with the size of the region of interest ROI. The former approach has an advantage in that image processing by the application controller is simplified by virtue of the frame rate being made constant. The latter has an advantage in that adaptability to a size change of the region of interest ROI increases. In the address control according to Example 9, either approach may be used.

Example 10

Example 10 is a modification of Example 2, and is an example where Image Output 2 for readout of the ROI image is controlled not to overlap Image Output 1 for readout of the full screen image in terms of time. An explanatory diagram of the address control according to Example 10 is illustrated in FIG. 21.

Figure 21:
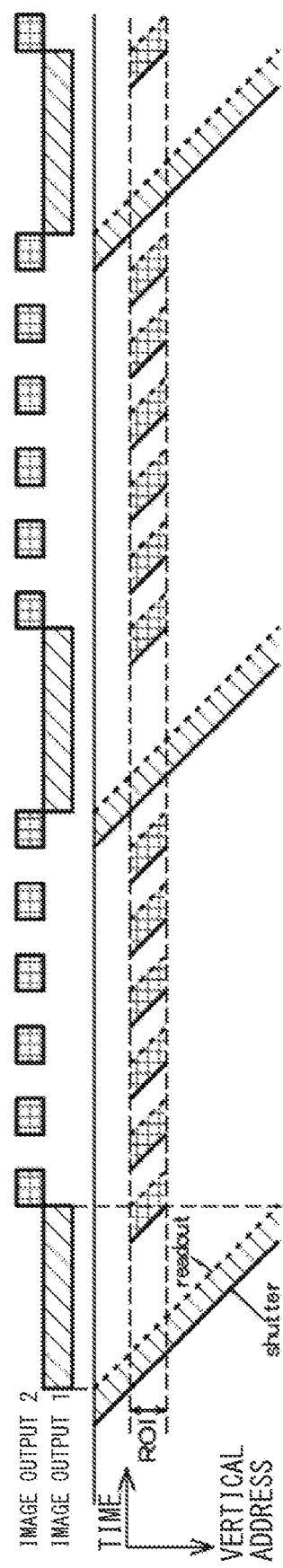
FIG. 21 is an explanatory diagram regarding address control according to Example 10.

In order to prevent Image Output 2 for readout of the ROI image from overlapping Image Output 1 for readout of the full screen image in terms of time, in Example 10, as illustrated in FIG. 21, the address control is performed so as to switch to Image Output 2 after completion of Image Output 1 and to switch to Image Output 1 after completion of Image Output 2.

As described above, in Example 10, readout of the ROI portion is not performed during output of the full screen image, and therefore the frame rate of the ROI portion becomes partly slow. Alternate switching between Image Output 1 and Image Output 2 reduces respective times by half; however, Example 10 allows for respective exclusive use, thus making it possible to perform reading out at high speed.

Modification Example

The technology of the present disclosure has been described above on the basis of the preferred embodiment; however, the technology of the present disclosure is not limited to the embodiment. The configurations and structures of the imaging device described in the foregoing embodiment are illustrative and are modifiable.

For example, in the foregoing embodiment, the description has been given with reference to an example case where the technology is applied to a CMOS image sensor in which the pixels 20 are arranged in a matrix; however, the technology of the present disclosure is not limited to the application to the CMOS image sensor. In other words, the technology of the present disclosure is generally applicable to imaging devices of the X-Y addressing method in which the pixels 20 are two-dimensionally arranged in a matrix.

Example of Practical Application

Figure 22:
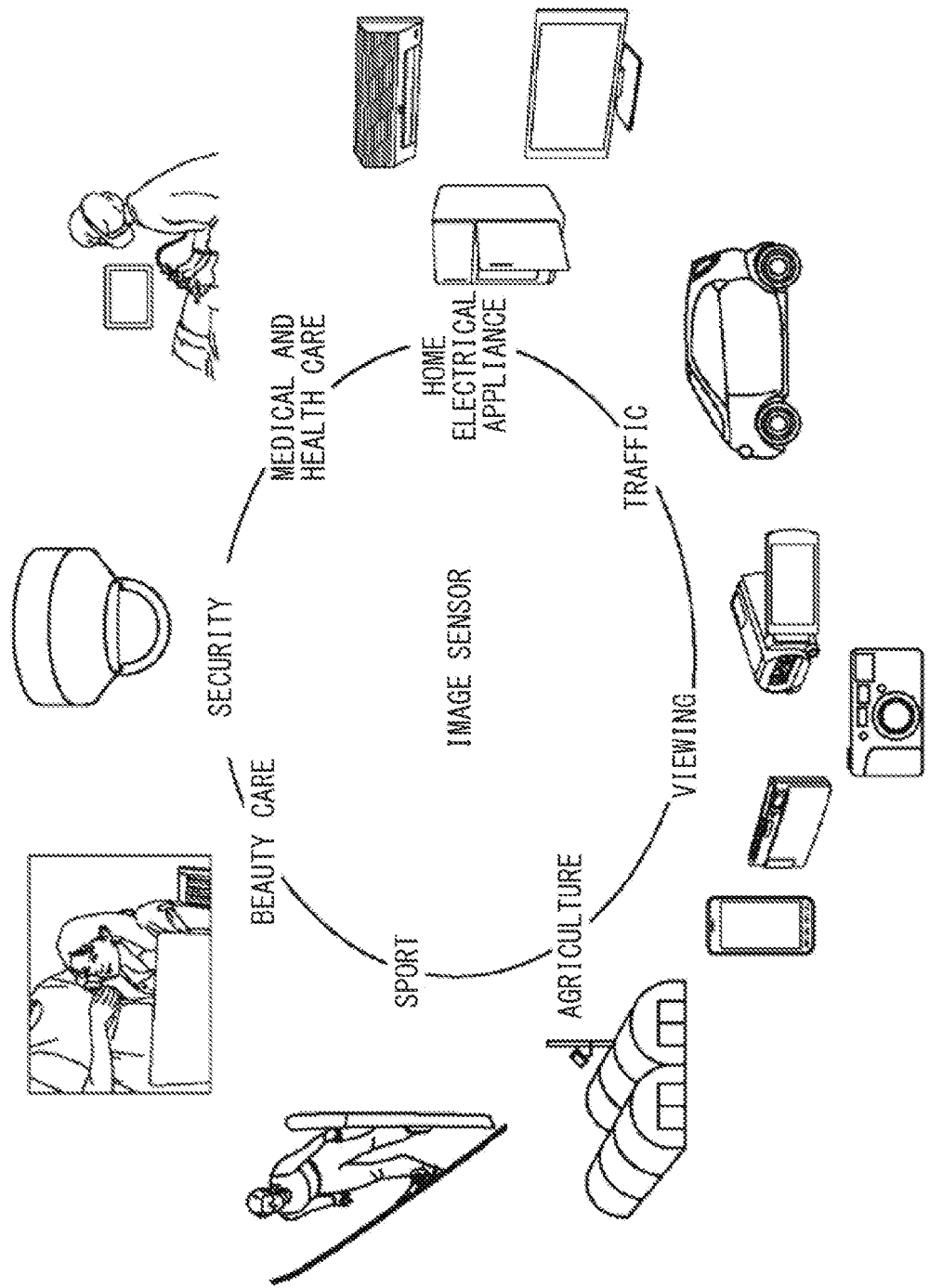
FIG. 22 is a diagram illustrating examples of practical application of the technology of the present disclosure.

As illustrated in FIG. 22, for example, the imaging device according to the present embodiment described above is usable in various apparatuses that sense light such as visible light, infrared light, ultraviolet light, or X-ray. Specific examples of the various apparatuses are listed below.

Apparatuses that shoot images used for viewing, including digital cameras and portable equipment having a camera function Apparatuses for traffic use including: onboard sensors that shoot images of the front, back, surroundings, inside, and the like of an automobile for safe driving such as automatic stop or for recognition of a driver's state; monitoring cameras that monitor traveling vehicles and roads; and distance measurement sensors that measure vehicle-to-vehicle distances and the like Apparatuses for use in home electrical appliances including televisions, refrigerators, and air conditioners to shoot images of the user's gesture and bring the appliances into operation in accordance with the gesture Apparatuses for medical care and health care use including endoscopes and apparatuses that shoot images of blood vessels by receiving infrared light Apparatuses for security use including monitoring cameras for crime prevention and cameras for individual authentication Apparatuses for beauty care use including skin measuring devices that shoot images of skin and microscopes that shoot images of scalp Apparatuses for sporting use including action cameras and wearable cameras for sporting applications, etc.

Apparatuses for agricultural use including cameras for monitoring the state of fields and crops Application Example The technology of the present disclosure is applicable to various products. More specifically, the technology is applicable to electronic equipment, including: an imaging apparatus such as a digital still camera or a video camera; a mobile terminal apparatus having an imaging function such as a mobile phone; and a copying machine using an imaging device in an image readout section. In the following, a case where the technology is applied to an imaging apparatus such as a digital still camera or a video camera will be described.

[Imaging Apparatus]

Figure 23:
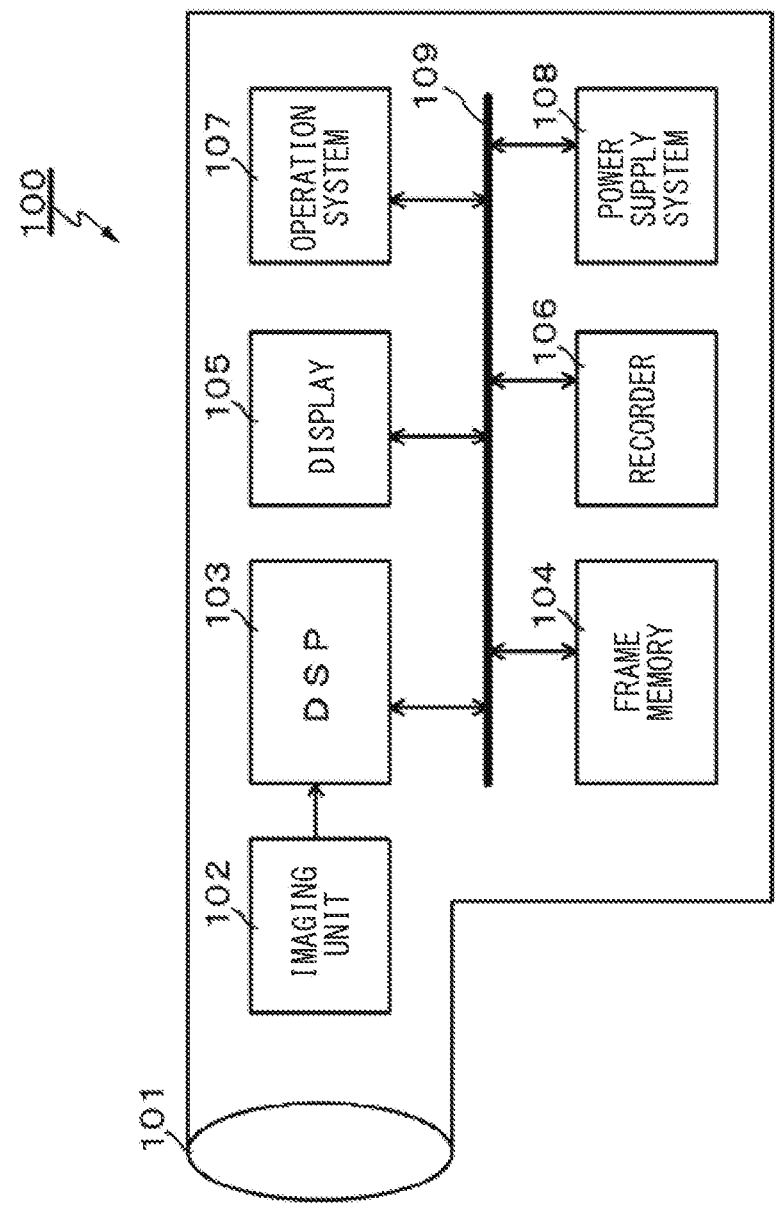
FIG. 23 is a block diagram illustrating an outline of a configuration of an imaging apparatus that is an example of electronic equipment.

FIG. 23 is a block diagram illustrating a configuration of an imaging apparatus that is an example of the electronic equipment. As illustrated in FIG. 23, the imaging apparatus 100 according to this example includes an imaging optical system 101 including a lens group or the like, an imaging unit 102, a DSP (Digital Signal Processor) circuit 103, a frame memory 104, a display 105, a recorder 106, an operation system 107, a power supply system 108, etc. In addition, the DSP circuit 103, the frame memory 104, the display 105, the recorder 106, the operation system 107, and the power supply system 108 are coupled to each other via a bus line 109.

The imaging optical system 101 captures entering light (image light) from a subject and forms an image on an imaging surface of the imaging unit 102. The imaging unit 102 converts a light amount of the entering light formed as an image on the imaging surface by the optical system 101 into an electric signal on a per-pixel basis and outputs the electric signal as a pixel signal. The DSP circuit 103 performs typical camera signal processing, such as white balance processing, de-mosaic processing, and gamma correction processing, for example.

The frame memory 104 is used for storing data as appropriate in the process of signal processing at the DSP circuit 103. The display 105 includes a panel-type display such as a liquid crystal display or an organic EL (electro luminescence) display, and displays a moving image or a still image captured by the imaging unit 102. The recorder 106 records the moving image or the still image captured by the imaging unit 102 on a recording medium such as a portable semiconductor memory, an optical disk, or an HDD (Hard Disk Drive).

The operation system 107 issues an operation command for various functions of the imaging apparatus 100 under a user's operation. The power supply system 108 appropriately supplies various power serving as operation power supplies for the DSP circuit 103, the frame memory 104, the display 105, the recorder 106, and the operation system 107 to these supply targets.

In the imaging apparatus 100 of the above-described configuration, it is possible to use, as the imaging unit 102, the imaging device according to the foregoing embodiment that is small in circuit scale and able to achieve readout driving of the pixels in a specific region (region of interest) and readout driving of the pixels in the whole angle of view with low power consumption. By using the imaging device as the imaging unit 102, it is possible to contribute to downsizing and lower power consumption of the imaging apparatus 100.

<Configuration Achievable by Employing Present Disclosure>

Note that the present disclosure may have the following configurations.

<<A. Imaging Device>>

[A-1] An imaging device including:
  a pixel array section in which pixels including light receiving element are arranged;
  a first pixel control section that performs control to read out signals of all the pixels in the pixel array section at a first frame rate;
  a second pixel control section that performs control to read out signals of the pixels in a specific region in the pixel array section at a second frame rate higher than the first frame rate; and
  an analog-to-digital conversion section that performs an analog-to-digital conversion on a pixel signal read out by the control performed by the first pixel control section or the second pixel control section.

[A-2] The imaging device according to [A-1], including a region-of-interest detector that detects a specific region in a captured image as a region of interest.

[A-3] The imaging device according to [A-2], in which the region-of-interest detector detects a region having motion in the captured image as the region of interest.

[A-4] The imaging device according to [A-3], in which the region-of-interest detector detects the region having motion in the captured image on the basis of a result of comparison between image information of a current imaging frame and image information preceding by at least one imaging frame.

[A-5] The imaging device according to [A-4], in which
  the region-of-interest detector includes an image memory, a comparison section, a movement amount memory, and a region-of-interest determination section,
  the image memory holds the image information preceding by at least one imaging frame,
  the comparison section acquires a difference absolute value between the image information of the current imaging frame and the image information held in the image memory,
  the movement amount memory stores the difference absolute value acquired by the comparison section as a movement amount from a past image to a current image, and
  the region-of-interest determination section determines the region of interest on the basis of the movement amount stored in the movement amount memory.

[A-6] The imaging device according to [A-5], in which the region-of-interest detector includes a location information acquisition section that acquires vertical location information and horizontal location information of a physical location of a region determined as the region of interest by the region-of-interest determination section.

[A-7] The imaging device according to [A-6], in which the second pixel control section repeatedly executes a readout operation on a signal of each of the pixels in a pixel row including the region of interest on the basis of the vertical location information acquired by the location information acquisition section.

[A-8] The imaging device according to [A-7], including
  a latch buffer section that latches pixel data after the analog-to-digital conversion by the analog-to-digital conversion section, and
  a horizontal region-of-interest cutting section that performs cutting, in a horizontal direction, of the pixel data outputted from the latch buffer section on the basis of the vertical location information acquired by the location information acquisition section.

[A-9] The imaging device according to any one of [A-1] to [A-8], in which
  two systems of signal lines for reading out a signal of each of the pixels in the pixel array section are provided on a per-pixel-column basis, and
  each of the pixels in the pixel array section has two switches for reading out the signal of the pixel to the two systems of signal lines, respectively.

[A-10] The imaging device according to [A-9], in which two systems of the analog-to-digital conversion sections are provided in correspondence with the two systems of signal lines, respectively.

[A-11] The imaging device according to [A-9] or [A-10], in which the first pixel control section and the second pixel control section perform control to read out the signals of all the pixels in the pixel array section and the signals of the pixels in the specific region concurrently through the two systems of signal lines.

[A-12] The imaging device according to any one of [A-1] to [A-8], in which
  one system of signal line for reading out a signal of each of the pixels in the pixel array section is provided on a per-pixel-column basis, and
  the first pixel control section and the second pixel control section perform control to read out the signals of all the pixels in the pixel array section and the signals of the pixels in the specific region in a time-division manner by switching therebetween alternately in terms of time.

[A-13] The imaging device according to any one of [A-1] to [A-12], having a chip structure including a single chip.

<<B. Method of Driving Imaging Device>>

[B-1] A method of driving an imaging device, the imaging device including:
  a pixel array section in which pixels including light receiving elements are arranged; and
  an analog-to-digital conversion section that performs an analog-to-digital conversion on a pixel signal read out from the pixel array section,
  the method including, in driving the imaging device,
  reading out signals of all the pixels in the pixel array section at a first frame rate, and reading out signals of the pixels in a specific region in the pixel array section at a second frame rate higher than the first frame rate.

[B-2] The method of driving the imaging device according to [B-1], including performing control to read out the signals of all the pixels in the pixel array section and the signals of the pixels in the specific region concurrently through two systems of signal lines.

[B-3] The method of driving the imaging device according to [B-1], including performing control to read out the signals of all the pixels in the pixel array section and the signals of the pixels in the specific region in a time-division manner by switching therebetween alternately in terms of time through one system of signal line.

<<C. Electronic Equipment>>

[C-1] Electronic equipment including an imaging device, the imaging device including:
  a pixel array section in which pixels including light receiving elements are arranged;
  a first pixel control section that performs control to read out signals of all the pixels in the pixel array section at a first frame rate;
  a second pixel control section that performs control to read out signals of the pixels in a specific region in the pixel array section at a second frame rate higher than the first frame rate; and
  an analog-to-digital conversion section that performs an analog-to-digital conversion on a pixel signal read out by the control performed by the first pixel control section or the second pixel control section.

[C-2] The electronic equipment according to [C-1], including a region-of-interest detector that detects a specific region in a captured image as a region of interest.

[C-3] The electronic equipment according to [C-2], in which the region-of-interest detector detects a region having motion in the captured image as the region of interest.

[C-4] The electronic equipment according to [C-3], in which the region-of-interest detector detects the region having motion in the captured image on the basis of a result of comparison between image information of a current imaging frame and image information preceding by at least one imaging frame.

[C-5] The electronic equipment according to [C-4], in which
  the region-of-interest detector includes an image memory, a comparison section, a movement amount memory, and a region-of-interest determination section,
  the image memory holds the image information preceding by at least one imaging frame,
  the comparison section acquires a difference absolute value between the image information of the current imaging frame and the image information held in the image memory,
  the movement amount memory stores the difference absolute value acquired by the comparison section as a movement amount from a past image to a current image, and
  the region-of-interest determination section determines the region of interest on the basis of the movement amount stored in the movement amount memory.

[C-6] The electronic equipment according to [C-5], in which the region-of-interest detector includes a location information acquisition section that acquires vertical location information and horizontal location information of a physical location of a region determined as the region of interest by the region-of-interest determination section.

[C-7] The electronic equipment according to [C-6], in which the second pixel control section repeatedly executes a read-out operation on a signal of each of the pixels in a pixel row including the region of interest on the basis of the vertical location information acquired by the location information acquisition section.

[C-8] The electronic equipment according to [C-7], including
  a latch buffer section that latches pixel data after the analog-to-digital conversion by the analog-to-digital conversion section, and
  a horizontal region-of-interest cutting section that performs cutting, in a horizontal direction, of the pixel data outputted from the latch buffer section on the basis of the vertical location information acquired by the location information acquisition section.

[C-9] The electronic equipment according to any one of [C-1] to [C-8], in which
  two systems of signal lines for reading out a signal of each of the pixels in the pixel array section are provided on a per-pixel-column basis, and
  each of the pixels in the pixel array section has two switches for reading out the signal of the pixel to the two systems of signal lines, respectively.

[C-10] The electronic equipment according to [C-9], in which two systems of the analog-to-digital conversion sections are provided in correspondence with the two systems of signal lines, respectively.

[C-11] The electronic equipment according to [C-9] or [C-10], in which the first pixel control section and the second pixel control section perform control to read out the signals of all the pixels in the pixel array section and the signals of the pixels in the specific region concurrently through the two systems of signal lines.

[C-12] The electronic equipment according to any one of [C-1] to [C-8], including
  one system of signal line for reading out a signal of each of the pixels in the pixel array section is provided on a per-pixel-column basis, and
  the first pixel control section and the second pixel control section perform control to read out the signals of all the pixels in the pixel array section and the signals of the pixels in the specific region in a time-division manner by switching therebetween alternately in terms of time.

[C-13] The electronic equipment according to any one of [C-1] to [C-12], having a chip structure including a single chip.

REFERENCE SIGNS LIST

10 . . . imaging device, 11 . . . pixel array section, 12 . . . row selector, 13 . . . analog-to-digital conversion section, 14 . . . latch buffer section, 15 . . . horizontal region-of-interest cutting section, 16A, 16B . . . image processor, 17 . . . output interface section, 18 . . . region-of-interest detector, 19A . . . first pixel control section, 19B . . . second pixel control section, 20 . . . pixel, 21 . . . photodiode, 22 . . . transfer transistor, 23 . . . reset transistor, 24 . . . amplification transistor, 25 . . . selection transistor, 31 ($31_1$ to $31_m$) . . . pixel drive line, 32 ($32_1$ to $32_n$) . . . vertical signal line, 100 . . . imaging apparatus, 131 . . . analog-to-digital converter, 141 . . . latch circuit, 181 . . . image storage section, 182 . . . image memory, 183 . . . comparison section, 184 . . . movement amount memory, 185 . . . region-of-interest determination section, 186 . . . location information acquisition section

The invention claimed is:

1. An imaging device, comprising:
   a pixel array section including a plurality of pixels, wherein the plurality of pixels includes light receiving elements;
   a first pixel control section configured to control a first read out of a plurality of pixel signals of the plurality of pixels at a first frame rate;
   a second pixel control section configured to control a second read out of a first set of pixel signals of a first set of pixels in a specific region in the pixel array section at a second frame rate, wherein
      the plurality of pixels includes the first set of pixels, and
      the second frame rate is higher than the first frame rate;
   an analog-to-digital conversion section configured to execute an analog-to-digital conversion on a pixel signal, of each pixel of the plurality of pixel signals, read out by one of the first pixel control section or the second pixel control section; and
   two systems of readout signal lines configured to read out the pixel signal of each pixel of the plurality of pixels, wherein
      the two systems of readout signal lines include a first readout signal line and a second readout signal line on a per-pixel-column basis, and
      each pixel of the plurality of pixels is configured to be connected to both the first readout signal line and the second readout signal line.

2. The imaging device according to claim 1, comprising a region-of-interest detector configured to detect the specific region in a captured image as a region of interest.

3. The imaging device according to claim 2, wherein the region-of-interest detector is further configured to detect a region having motion in the captured image as the region of interest.

4. The imaging device according to claim 3, wherein the region-of-interest detector is further configured to detect the region having motion in the captured image based on a result of comparison between image information of a current imaging frame and image information preceding by at least one imaging frame.

5. The imaging device according to claim 4, wherein
   the region-of-interest detector is further configured to include an image memory, a comparison section, a movement amount memory, and a region-of-interest determination section,
   the image memory is configured to hold the image information preceding by the at least one imaging frame,
   the comparison section is configured to acquire a difference absolute value between the image information of the current imaging frame and the image information held in the image memory,
   the movement amount memory is further configured to store the difference absolute value as a movement amount from a past image to a current image, and
   the region-of-interest determination section is further configured to determine the region of interest based on the movement amount stored in the movement amount memory.

6. The imaging device according to claim 5, wherein
   the region-of-interest detector is further configured to include a location information acquisition section, and
   the location information acquisition section is configured to acquire vertical location information and horizontal location information of a physical location of the determined region of interest.

7. The imaging device according to claim 6, wherein
   the second pixel control section is further configured to repeatedly execute a readout operation on the pixel signal of each pixel of the plurality of pixels in a pixel row which includes the region of interest, and
   the readout operation is executed based on the acquired vertical location information.

8. The imaging device according to claim 7, further comprising:
   a latch buffer section configured to latch pixel data after the analog-to-digital conversion by the analog-to-digital conversion section, and
   a horizontal region-of-interest cutting section configured to cut, in a horizontal direction, of the pixel data based on the acquired vertical location information.

9. The imaging device according to claim 1, wherein
   each pixel of the plurality of pixels in the pixel array section comprises a first switch and a second switch, and
   the pixel signal from each pixel of the plurality of pixels is read out by
      the first readout signal line via the first switch, and
      the second readout signal line via the second switch.

10. The imaging device according to claim 9, further comprising two systems of analog-to-digital conversion sections associated with the two systems of readout signal lines, respectively, wherein the analog-to-digital conversion sections include the analog-to-digital conversion section.

11. The imaging device according to claim 9, wherein the first pixel control section and the second pixel control section are configured to control the first read out of the plurality of pixel signals of the plurality of pixels and the second read out of the first set of pixel signals of the first set of pixels concurrently via the two systems of readout signal lines.

12. The imaging device according to claim 1, wherein
   a first system of the two systems of readout signal lines to read out the pixel signal of each pixel of the plurality of pixels is on the per-pixel-column basis, and
   the first pixel control section and the second pixel control section are configured to control the first read out of the plurality of pixel signals of the plurality of pixels in the pixel array section and the second read out of the first set of pixel signals of the first set of pixels in the specific region in a time-division manner by switching alternately between the first read out and the second read out with respect to time.

13. The imaging device according to claim 1, further comprising a chip structure including a single chip.

14. A method of driving an imaging device, the method comprising, in driving the imaging device,
   reading out, via a first pixel control section, a plurality of pixel signals of a plurality of pixels in a pixel array section at a first frame rate;
   reading out, via a second pixel control section, a first set of pixel signals of a first set of pixels in a specific region in the pixel array section at a second frame rate, wherein
      the plurality of pixels includes the first set of pixels, and
      the second frame rate is higher than the first frame rate
   converting, from analog-to-digital, a pixel signal of each pixel of the plurality of pixel signals read out by one of the first pixel control section or the second pixel control section; and
   reading out, via two systems of read out signal lines, the pixel signal of each pixel of the plurality of pixels, wherein the two systems of readout signal lines include a first readout signal line and a second readout signal line on a per-pixel-column basis, each pixel of the plurality of pixels is configured to be connected to both the first readout signal line and the second readout signal line, and the pixel signal of each pixel of the plurality of pixels is read out by both the first readout signal line and the second readout signal line.

15. Electronic equipment comprising an imaging device, the imaging device including:

a pixel array section including a plurality of pixels, wherein the plurality of pixels includes light receiving elements;

a first pixel control section configured to control a first read out of a plurality of pixel signals of the plurality of pixels at a first frame rate;

a second pixel control section configured to control a second read out of a first set of pixel signals of a first set of pixels in a specific region in the pixel array section at a second frame rate, wherein the plurality of pixels includes the first set of pixels, and the second frame rate is higher than the first frame rate;

an analog-to-digital conversion section configured to execute analog-to-digital conversion on a pixel signal of each pixel of the plurality of pixel signals read out by one of the first pixel control section or the second pixel control section; and two systems of readout signal lines configured to read out pixel signal of each pixel of the plurality of pixels, wherein the two systems of readout signal lines include a first readout signal line and a second readout signal line on a per-pixel-column basis, and each pixel of the plurality of pixels is configured to be connected to both the first readout signal line and the second readout signal line.

16. An imaging device, comprising:

a pixel array section including a plurality of pixels, wherein the plurality of pixels includes light receiving elements;

a region-of-interest detector configured to detect a specific region, as a region of interest, in a captured image based on a result of comparison between image information of a current imaging frame and image information preceding by at least one imaging frame, wherein the region of interest corresponds to a region having motion in the captured image, the region-of-interest detector is further configured to include an image memory, a comparison section, a movement amount memory, and a region-of-interest determination section, the image memory is configured to hold the image information preceding by the at least one imaging frame, the comparison section is configured to acquire a difference absolute value between the image information of the current imaging frame and the image information held in the image memory, the movement amount memory is further configured to store the difference absolute value as a movement amount from a past image to a current image, and the region-of-interest determination section is further configured to determine the region of interest based on the movement amount stored in the movement amount memory;

a first pixel control section configured to control a first read out of a plurality of pixel signals of the plurality of pixels at a first frame rate;

a second pixel control section configured to control a second read out of a first set of pixel signals of a first set of pixels in the specific region in the pixel array section at a second frame rate, wherein the plurality of pixels includes the first set of pixels, and the second frame rate is higher than the first frame rate; and an analog-to-digital conversion section configured to execute an analog-to-digital conversion on a pixel signal, of each pixel of the plurality of pixel signals, read out by one of the first pixel control section or the second pixel control section.

* * * * *